US011475411B2

(12) United States Patent
Shaaban et al.

(10) Patent No.: US 11,475,411 B2
(45) Date of Patent: Oct. 18, 2022

(54) SYSTEM AND METHOD FOR BILLING AND PROFESSIONAL COMPANIES AND FIRMS RELATING TO BUDGETS AND MONTHLY BILLS

(71) Applicants: Ahmed Farouk Shaaban, South Barrington, IL (US); Venkat Thandra, South Barrington, IL (US)

(72) Inventors: Ahmed Farouk Shaaban, South Barrington, IL (US); Venkat Thandra, South Barrington, IL (US)

(73) Assignee: FULCRUM GLOBAL TECHNOLOGIES INC., Chicago, IL (US)

( * ) Notice: Subject to any disclaimer, the term of this patent is extended or adjusted under 35 U.S.C. 154(b) by 231 days.

(21) Appl. No.: 16/110,984

(22) Filed: Aug. 23, 2018

(65) Prior Publication Data

US 2019/0066057 A1    Feb. 28, 2019

Related U.S. Application Data

(63) Continuation of application No. 14/756,618, filed on Jun. 30, 2015, now abandoned.
(Continued)

(51) Int. Cl.
*G06Q 10/10* (2012.01)
*G09C 1/00* (2006.01)
(Continued)

(52) U.S. Cl.
CPC ......... *G06Q 10/1091* (2013.01); *G06Q 10/06* (2013.01); *G06Q 30/04* (2013.01); *G09C 1/00* (2013.01); *G06Q 30/06* (2013.01)

(58) Field of Classification Search
CPC .. G06Q 10/109; G06Q 10/1091; G06Q 10/06; G06Q 30/06; G09C 1/00
See application file for complete search history.

(56) References Cited

U.S. PATENT DOCUMENTS

| 2004/0035922 | A1 | 2/2004 | Cameron |
| 2005/0033609 | A1* | 2/2005 | Yang ...................... G06Q 10/10 |
| | | | 705/2 |

(Continued)

FOREIGN PATENT DOCUMENTS

| CN | 156847 A | 1/2005 |
| CN | 101471897 A | 7/2009 |
| CN | 103324425 A | 9/2013 |

OTHER PUBLICATIONS

"Sage Timeslips User's Guide", 2012 (Year: 2012).*
(Continued)

*Primary Examiner* — Allen C Chein
(74) *Attorney, Agent, or Firm* — Global IP Counselors, LLP

(57) ABSTRACT

The present invention consists of an improved system and method for timekeeping and billing in professional services firms such as those in the areas of law, accounting, architecture and engineering. In the present invention, systems and methods are developed for improved development and management of client budgets where expenditures are continually traced and electronic notices of progress may be automatically transmitted to the client or customer. In addition, security is enhanced by providing security by employee name, level or job title for sensitive client information. Volume discounts can be automatically applied across client name, phase, matter or activity. The client may be provided with an online account secure with an unique ID and password. The system can also handle multiple currencies,
(Continued)

payment methods and languages. Clients may be provided with interim bills in real time, as work progresses.

16 Claims, 19 Drawing Sheets

Related U.S. Application Data

(60) Provisional application No. 61/998,577, filed on Jun. 30, 2014.

(51) Int. Cl.
  *G06Q 10/06* (2012.01)
  *G06Q 30/04* (2012.01)
  *G06Q 30/06* (2012.01)

(56) References Cited

U.S. PATENT DOCUMENTS

| | | | |
|---|---|---|---|
| 2005/0203814 A1* | 9/2005 | Derry | G06Q 10/10 705/30 |
| 2007/0094110 A1 | 4/2007 | McCrea | |
| 2011/0112891 A1 | 5/2011 | Alber et al. | |
| 2011/0238853 A1 | 9/2011 | Paul et al. | |
| 2012/0303403 A1* | 11/2012 | Lee | G06Q 50/18 705/7.15 |
| 2014/0268243 A1* | 9/2014 | Mitsubori | G06Q 10/10 358/402 |

OTHER PUBLICATIONS

"Bidirectional Linkig of 2 Cells", BombCenter, 2012, available at https://www.mrexcel.com/board/threads/bi-directional-linking-of-2-cells.628507/ (Year: 2012).*

Bill4time, 2013, available at https://web.archive.org/web/20140327100218/https://www.bill4time.com/manuals/bill4time-administration-guide.pdf (Year: 2014).*

Rasheed, "Avaza Releases More Flexible Invoice Templates", Mar. 2017, available at https://www.avaza.com/avaza-releases-more-flexible-invoice-templates/ (Year: 2017).*

Introduction to Sage Timeslips, Sep. 2021.

A Decision of Rejection in the corresponding Chinese Patent Application No. 201580046279.X, dated May 26, 2021.

A First Office Action of Rejection in the corresponding Chinese Patent Application No. 201580046279.X, dated Mar. 20, 2020.

A Second Office Action in the corresponding Chinese Patent Application No. 201580046279.X, dated Dec. 1, 2020.

An Examination Report No. 1 in the corresponding Australian Patent Application No. 2015284131, dated Mar. 12, 2020.

A Search Report and Written Opinion in the corresponding Brazilian Patent Application No. BR112016031021-7, dated Dec. 1, 2020.

A Preliminary Report in the corresponding PCT Patent Application No. PCT/US2015/038706, dated Oct. 14, 2015.

A Search Report in the corresponding European Patent Application No. 15814628.2, dated Aug. 11, 2017.

An Annex to the communication in the corresponding European Patent Application No. 15814628.2, dated Apr. 5, 2019.

* cited by examiner

| | Billing document Edit Goto Environment System Help | | | | | |
|---|---|---|---|---|---|---|
| | ⌀ ▽ « 🖫🖫🖫🖫🖫🖫🖫🖫🖫🖫🖫🖫🖫🖫 | | | | | |

*Final Invoice 9765000139 (ZL2) Change: Overview of Billing Items*

| 🗎▷ | 🔍 Accounting | 🖽 Billing documents | ❷ | | | |
|---|---|---|---|---|---|---|
| ZL2 Final Invoice | ▽ | 9765000139 | | Net Value | 325,554.43 | ZAR |
| Payer | | 80030815 | | Solutions & Network South Africa/12 Maple Av... | | 🖼 |
| Billing Date | | 02/12/2015 | | | | |

| Item | Description | Billed Quantity | SU | Net Value | Material | Cost |
|---|---|---|---|---|---|---|
| 40 | FEE | 1.1 | HR | 957.97 | FEE | 0.00 |
| 70 | FEE | 2.3 | HR | 2,003.02 | FEE | 0.00 |
| 80 | FEE | 0.6 | HR | 522.53 | FEE | 0.00 |
| 90 | FEE | 0.9 | HR | 783.79 | FEE | 0.00 |
| 100 | FEE | 1.2 | HR | 1,045.06 | FEE | 0.00 |
| 110 | FEE | 5.1 | HR | 4,441.49 | FEE | 0.00 |
| 120 | FEE | 3.5 | HR | 3,048.08 | FEE | 0.00 |
| 130 | FEE | 3.7 | HR | 3,222.26 | FEE | 0.00 |
| 140 | FEE | 0.1 | HR | 158.34 | FEE | 0.00 |
| 150 | FEE | 2.2 | HR | 3,483.52 | FEE | 0.00 |
| 160 | FEE | 0.3 | HR | 475.02 | FEE | 0.00 |

| File | Home | Insert | Page Layout | Formula | Data | Review | View | Devolper | Plan Tools | Layout | Design | EPM | Data Manager | PDF | | |
|---|---|---|---|---|---|---|---|---|---|---|---|---|---|---|---|---|
| Log Off | Open Save | Edit Report | New Report Report Actors View Formats | Refresh | Expand Collapse | Keep Excuse | Back | Save Data | Spread, Trero... Comments Journals | Portal Publication Book Publication Distribution | | | Quick Links Drill Through Offline Mode | Insert Function Options More | Show Pane &Context | About Help | |
| Connection | Reports | | | | Data Analysis | | Undo | Data Input | | Collaboration | | | Tools | | | Help | |

CLIENT MATTER QUOTE-LEVEL

CLIENT Client002__Temp  DISCOUNT% 0.10
MATTER Matter_9_Temp
PARTNER Anthony Ther...
BILLABLE CURRENCY US Dollar
PERIOD 2015
TRANSACTION TYPE Fees
CATEGORY Quote

| PHASES | OFFICE | PRACTICE | LEVEL | EFFORTS (Hrs) | RESOURCES | TOTAL HOURS | MIN RATE | MAX RATE | AVG RATE | SELECTED RATE | TOTAL FEES | ESTIMATED COST |
|---|---|---|---|---|---|---|---|---|---|---|---|---|
| | OF02-Office 2 | PR01-Antitrust & Compensation | JA-Junior Associate | | | 0 | 250 | 500 | 375 | 375 | 0 | 0 |
| | | | SA-Senior Associate | 120 | 6 | 720 | 400 | 750 | 675 | 675 | 486,000 | 150000 |
| | | | PA-Partner | 120 | 2 | 240 | 800 | 1100 | 950 | 950 | 228,000 | 156000 |
| | | PR02-Banking & Finance | JA-Junior Associate | | | 0 | 250 | 500 | 375 | 375 | 0 | 0 |
| | | | SA-Senior Associate | | | 0 | 400 | 750 | 675 | 675 | 0 | 0 |
| | | | PA-Partner | | | 0 | 800 | 1100 | 950 | 950 | 0 | 0 |
| | OF03-Office 3 | PR01-Antitrust & Compensation | JA-Junior Associate | | | 0 | 250 | 500 | 375 | 375 | 0 | 0 |
| | | | SA-Senior Associate | | | 0 | 400 | 750 | 675 | 675 | 0 | 0 |
| | | | PA-Partner | | | 0 | 800 | 1100 | 950 | 950 | 0 | 0 |
| | | PR02-Banking & Finance | JA-Junior Associate | | | 0 | 250 | 500 | 375 | 375 | 0 | 0 |
| | | | SA-Senior Associate | | | 0 | 400 | 750 | 675 | 675 | 0 | 0 |
| | | | PA-Partner | | | 0 | 800 | 1100 | 950 | 950 | 0 | 0 |
| | OF04-Office 4 | PR01-Antitrust & Compensation | JA-Junior Associate | | | 0 | 250 | 500 | 375 | 375 | 0 | 0 |
| | | | SA-Senior Associate | | | 0 | 400 | 750 | 675 | 675 | 0 | 0 |
| | | | PA-Partner | | | 0 | 800 | 1100 | 950 | 950 | 0 | 0 |
| | | | Total AVERAGE | 6,120.00 | 82.09 | 20,880.00 | 0.00 | 0.00 | 120,000.00 | 17,850.90 | 10,552,500.00 | 6,279,500.00 |

*FIG. 12*

CLIENT MATTER QUOTE LEVEL

- CLIENT: Client02_Temp  DISCOUNT%: 0.10
- MATTER: Matter_9_Temp
- PARTNER: Anthony Theo
- BILLABLE CURRENCY: US Dollar
- PERIOD: 2015
- TRANSACTION TYPE: Fees
- CATEGORY: Quote

| PHASES | OFFICE | PRACTICE | LEVEL | TOTAL HOURS | MIN RATES | MAX RATE | AVG RATE | SELECTED RATE | TOTAL FEES | ESTIMATED COST | DISCOUNT FEES | MARGIN % |
|---|---|---|---|---|---|---|---|---|---|---|---|---|
| | OF02-Office 4 | PR01-Antitrust & Compensation | JA-Junior Associate | 0 | 250 | 500 | 375 | 375 | 0 | 0 | 0 | 0.00% |
| | | | SA-Senior Associate | 720 | 400 | 750 | 675 | 675 | 0 | 0 | 0 | 0.00% |
| | | | PA-Partner | 240 | 800 | 1100 | 950 | 950 | 0 | 0 | 0 | 0.00% |
| | | PR02-Banking & Finance | JA-Junior Associate | 0 | 250 | 500 | 375 | 375 | 0 | 0 | 0 | 0.00% |
| | | | SA-Senior Associate | 0 | 400 | 750 | 675 | 675 | 0 | 0 | 0 | 0.00% |
| | | | PA-Partner | 0 | 800 | 1100 | 950 | 950 | 0 | 0 | 0 | 0.00% |
| | OF05-Office 5 | PR01-Antitrust & Compensation | JA-Junior Associate | 0 | 250 | 500 | 375 | 375 | 0 | 0 | 0 | 0.00% |
| | | | SA-Senior Associate | 0 | 400 | 750 | 675 | 675 | 0 | 0 | 0 | 0.00% |
| | | | PA-Partner | 0 | 800 | 1100 | 950 | 950 | 0 | 0 | 0 | 0.00% |
| | | PR02-Banking & Finance | JA-Junior Associate | 0 | 250 | 500 | 375 | 375 | 0 | 0 | 0 | 0.00% |
| | | | SA-Senior Associate | 0 | 400 | 750 | 675 | 675 | 0 | 0 | 0 | 0.00% |
| | | | PA-Partner | 0 | 800 | 1100 | 950 | 950 | 0 | 0 | 0 | 0.00% |
| Total | | | | 20,880.00 | 0.00 | 0.00 | 120,000.00 | 17,850.00 | 10,552,500.00 | 6,279,500.00 | 9,497,250.00 | 1298.56% |
| AVERAGE | | | | | | | | | | | | 7.22% |

FIG. 13

MATTER QUOTE SUMMARY - BY PHASE

| | |
|---|---|
| CLIENT | Client 002_Temp |
| MATTER | Matter_9_Temp |
| PARTNER | Anthony Theo |
| BILLABLE CURRENCY | US Dollar |
| PERIOD | 2015 |
| TRANSACTION TYPE | Fees |
| OFFICE | TOTAL_OF—Total Offices |
| PRACTICE | TOTAL_PR—Total Practices |
| LEVEL | TOTAL_LE—Total Levels |
| CATEGORY | Quote |

| PHASE/TASKS | TOTAL HOURS | HOURS % | TOTAL FEES | FEES % | AVG BILL RATE |
|---|---|---|---|---|---|
| PH01 - Phase 1 | 5220 | 25 | 2803500 | 26.56716418 | 537.07 |
| PH02 - Phase 2 | 4500 | 21.55172414 | 2226000 | 21.09452736 | 494.67 |
| PH03 - Phase 3 | | 0 | | 0 | |
| PH04 - Phase 4 | 8040 | 38.50574713 | 3861000 | 36.58848614 | 480.22 |
| PH05 - Phase 5 | | 0 | | 0 | |
| PH06 - Phase 6 | 3120 | 14.94252874 | 1662000 | 15.74982232 | 532.69 |
| TOTAL | 20,880.00 | 100.00 | 10,552,500.00 | 100.00 | 2,044.65 |
| AVERAGE | | | | | 511.16 |

FIG. 14

MATTER QUOTE SUMMARY - BY OFFICE 248

| | |
|---|---|
| CLIENT | Client 002_Temp |
| MATTER | Matter_9_Temp |
| PARTNER | Anthony Theo |
| BILLABLE CURRENCY | US Dollar |
| PERIOD | 2015 |
| TRANSACTION TYPE | Fees |
| PHASE | TOTAL—Total Phases |
| PRACTICE | TOTAL_PR—Total Practices |
| LEVEL | TOTAL_LE—Total Levels |
| CATEGORY | Quote |

| OFFICE | TOTAL HOUS | HOURS % | TOTAL FEES | FEES % | AVG BILL RATE |
|---|---|---|---|---|---|
| OF01 – Office 1 | 17880 | 85.63218391 | 8323500 | 78.87704335 | 465.52 |
| OF02 – Office 2 | 3000 | 14.36781609 | 2229000 | 21.12295665 | 743.00 |
| OF03 – Office 3 | | | 0 | | 0 |
| OF04 – Office 4 | | | 0 | | 0 |
| OF05 – Office 5 | | | 0 | | 0 |
| OF06 – Office 6 | | | 0 | | 0 |
| TOTAL | 20,880.00 | 100.00 | 10,552,500.00 | 100.00 | 1,208.52 |
| AVERAGE | | | | | 604.26 |

| Client Matter Cost Margin % | Matter Summary - Phase | Matter Summary - Office | Matter Summary - Practice |

FIG. 15

MATTER QUOTE SUMMARY - BY PRACTICE — 250

- 200
- 204
- CLIENT: Client 002_Temp
- 208 — MATTER: Matter_9_Temp — 206
- PARTNER: Anthony Theo
- BILLABLE CURRENCY: US Dollar — 210
- PERIOD: 2015
- TRANSACTION TYPE: Fees
- OFFICE: TOTAL_OF—Total Offices
- PHASE: TOTAL—Total Phases
- LEVEL: TOTAL_LE—Total Levels
- CATEGORY: Quote

| PRACTICE (252) | TOTAL HOUS (236) | HOURS % (238) | TOTAL FEES (240) | FEES % (242) | AVG BILL RATE (244) |
|---|---|---|---|---|---|
| PR01 – Antitrust & Competition | 12720 | 60.91954023 | 7204500 | 68.27292111 | 566.39 |
| PR02 – Banking & Finance | 8160 | 39.08045977 | 3348000 | 31.72707889 | 410.29 |
| PR03 – Dispute Resolution | | 0 | | 0 | |
| PR04 – Employment | | 0 | | 0 | |
| PR05 – Energy, Mining & Infrast | | 0 | | 0 | |
| PR06 – Environmental | | 0 | | 0 | |
| PR07 – Financial Restructuring | | 0 | | 0 | |
| PR08 – Insurance | | 0 | | 0 | |
| PR09 – Intellectual Property | | 0 | | 0 | |
| PR10 – IT/Communications | | 0 | | 0 | |
| PR11 – Mergers & Acquisitions | | 0 | | 0 | |

FIG. 16

MATTER QUOTE SUMMARY - BY LEVEL — 254

- CLIENT Client 002_Temp — 204
- MATTER Matter_9_Temp — 206, 208
- PARTNER Anthony Theo
- BILLABLE CURRENCY US Dollar — 210
- PERIOD 2015
- TRANSACTION TYPE Fees
- OFFICE TOTAL_OF—Total Offices
- PRACTICE TOTAL_PR—Total Practices
- PHASE PH01—Phase 1
- CATEGORY Quote

| LEVEL (256) | TOTAL HOURS (236) | HOURS % (238) | TOTAL FEES (240) | FEES % (242) | AVG BILL RATE (244) |
|---|---|---|---|---|---|
| AA - Associate | 17880 | 85.63218391 | 8323500 | 78.87704335 | 465.52 |
| JA - Junior Associate | 3000 | 14.36781609 | 2229000 | 21.12295665 | 743.00 |
| OC - Of Counsel | | | 0 | 0 | |
| PA - Partner | | | 0 | 0 | |
| PL - Paralegal | | | 0 | 0 | |
| SA - Senior Associate | | | 0 | 0 | |
| TOTAL | 20,880.00 | 100.00 | 10,552,500.00 | 100.00 | 1,208.52 |
| AVERAGE | | | | | 604.26 |

Client Matter Cost Margin % | Matter Summary - Phase | Matter Summary - Level (258) | Matter Summary - Practice

ACTUAL vs BUDGET VARIANCE - BY LEVEL 280

| | | |
|---|---|---|
| CLIENT | 200000-Dynamic Ind. | DISCOUNT  10 |
| MATTER | DI Litigation Matter | |
| PARTNER | Anthony Theo | |
| BILLABLE CURRENCY | US Dollar | |
| PERIOD | 2015 | |
| TRANSACTION TYPE | Fees | |
| OFFICE | TOTAL_OF—Total Offices | |
| PRACTICE | TOTAL_PR—Total Practices | |

| PHASE/TASK | LEVEL | Total_Hrs Actual | Budget | VARIANCE | Total Fees Actual | Budget | VARIANCE |
|---|---|---|---|---|---|---|---|
| | PA - Partner | | | | 0.00 | | 0.00 |
| PH04 – Phase 4 | SA – Senior Associate | 96.24 | 1,440.00 | 1,343.76 | 64,962.00 | 972,000.00 | 907,038.00 |
| | JA – Junior Associate | 264.00 | 5,880.00 | 5,616.00 | 59,000.00 | 2,205,000.00 | 2,106,000.00 |
| | PA - Partner | 144.00 | 720.00 | 576.00 | 136,800.00 | 684,000.00 | 547,200.00 |
| PH05 – Phase 5 | SA – Senior Associate | | | 0.00 | | | 0.00 |
| | JA – Junior Associate | | | 0.00 | | | 0.00 |
| | PA - Partner | | | 0.00 | | | 0.00 |
| PH06 – Phase 6 | SA – Senior Associate | 0.00 | 720.00 | 720.00 | 0.00 | 486,000.00 | 486,000.00 |
| | JA – Junior Associate | 0.00 | 1,920.00 | 1,920.00 | 0.00 | 720,000.00 | 720,000.00 |
| | PA - Partner | 0.00 | 480.00 | 480.00 | 0.00 | 456,000.00 | 456,000.00 |
| TOTAL | | 6,564.24 | 20,880.00 | 14,880.00 | 3,329,262.00 | 10,552,500.00 | 7,223,238.00 |

FIG. 19

SYSTEM AND METHOD FOR BILLING AND PROFESSIONAL COMPANIES AND FIRMS RELATING TO BUDGETS AND MONTHLY BILLS

CROSS-REFERENCE TO RELATED APPLICATION

The instant application is a continuation of co-pending U.S. application Ser. No. 14/756,618 entitled "SYSTEM AND METHOD FOR BILLING AND PROFESSIONAL COMPANIES AND FIRMS RELATING TO BUDGETS AND MONTHLY BILLS" and filed Jun. 30, 2015, which prior application claimed the benefit of U.S. provisional application Ser. No. 61/998,577 filed Jun. 30, 2014, the teachings of which prior applications are incorporated herein by this reference.

FIELD

The present invention relates to the field of billing in professional firms and consulting companies, and relates more particularly to systems and methods for improved billing and budgets.

BACKGROUND

Currently, in the marketplace, there are available a wide variety of professional timekeeping and billing programs such as Timeslips, BillQuick, Clio and the like. In addition, a number of patents have been filed and issued on features and elements relating to the field of timekeeping and billing programs for professionals such as lawyers, architects, engineers and accountants.

EP 1,145,162 issued to Ashby discloses the use of a System for processing credit applications, financial and insurance services and administrative and management tools. The System will generate a price quote for insurance and finance and facilitate on line credit application processing. It will further provide detailed reports for finance, insurance inventory, tracking and other administrative matters. It will provide quick quotes for a lease or loan. It will also perform: inventory tracking, insurance tracking, purchase tracking, applicant profiling, targeted marketing, customer satisfaction, etc. The system will collect data for credit, a description of the item being sold, insurance will be offered for the item, licensing and data required for the government will be collected.

Ashby also discloses that the User can be a financial institution, a dealer, manufacturer, insurer or supplier. It can utilize and store credit agreements with customer ratings and interest rates which can be bundled and sold on a public exchange. FAQ's can be provided in the system, and it can provide Quick Quotes on the spot to the consumer. However, this disclosure is directed to car sales and insurance, not timekeeping. The terms it stores are contract terms, contract ID, customer ID, buy rate, the sales rate, dealer markup, payments, cash down, trade in value, lease fee, monthly payments, commission and taxes due. However, Ashby does not relate to professional timekeeping or billing.

EP Patent No. 1,769,452 issued to Allin discloses the use of a computerized system for residential and commercial construction projects to maintain and disburse construction draws during construction. It can track lien waivers, and can prepare, approve, sign and distribute hundreds of checks to subcontractors each month. It also tracks construction change orders. It can manage all of the persons involved in each draw. It manages and generates a construction budget and time line. It also manages payments to material suppliers. It can manage and store the inspection data for each project. It can manage budgets for GC's as well as the subs. It handles ACH payments. Template forms are utilized to facilitate the draw process. Notices can be sent by email, text or voice.

EP Patent No. 2,026,222 issued to Alquier discloses the use of a system and method which allows the addition, modification and deletion of data base fields dynamically without the use of a data base administrator. The system allows the addition and modification of an informational structure dynamically distributed directly via the user interface. It supports different types of entity attributes including, text, numerical information, date ad time, predefined values and binary objects, allows the creation of relational dependancies between information entities (e.g., patent/child), provides flexible reporting capabilities including spreadsheets, slides, documents, timelines, etc.; it allows a configurable data entry interface; it allows importation of data from external sources; it allows full text searches; logs modifications for an audit trial (important for pharma and med devices); includes email notifications. It allows for a user interface that is flexible and configurable. The system uses template items, coding and tables to accomplish these purposes. However, it is not directed toward time tracking and billing generation.

U.S. Patent Disclosure No. 2003/0120538 filed by Boerke, et al. discloses the use of a method for tracking progress on a task by dividing the period of time into a plurality of timeslots and determining a target number of subtasks to be completed during each timeslot. For example, the time slots may be divided into 15 minute increments. The system only tracks the number of subtasks completed for each timeslot. The method also keeps track statistically of variances in subtasks completed between workers. The task may include any type of work. The process may be used for planning purposes, i.e., as a planning tool such that management can plan and process daily or monthly work shifts according to the work to be done for particular tasks and subtasks. This helps a supervisor spot and correct negative variances in worker performance. The progress can be logged into a computer or worksheet or in paper format. Problems are also noted by the method for correction to improve performance by variance cards.

U.S. Patent Disclosure No. 2013/00090968 filed by Borza, discloses the use of an employee management and scheduling method which is directed to ensure that adequate personnel are present as required and that statutory requirements are met and costs are tracked and minimized. The Borza disclosure is also directed at apps for management cell phone usage wherein managers can track employees, their shifts and their skills and managing same. This allows for real time changes by employees that are sick or have not shown up for work. The locations may also be tracked. Scheduling software is used to manage multiple employees at multiple locations. From one screen, a manager may create, edit and delete shifts and also have access to other aspects of managing the organization staffings with information about positions, teams, skills, etc. being provided. The System can print Shift Assignment Reports and Employee Reports. However, this disclosure is directed toward scheduling employees and not tracking their time or billing for their time.

U.S. Patent Disclosure No. 2012/0233044 filed by Burger, et al., discloses the use of a Method and System for labor project management and costing which may run on a cell phone app to monitor employee activity, identify faulty activity and manage allocation of labor resources. The app, as installed on an employee cellphone, allows the employee to travel to various job locations and record the activities at each job location. The employee may log into or out of the timeclock app installed on the employee's cellphone. The system can be used to monitor managers and administrators as well as employees. The system can be used to transmit payroll information. A flag may be generated if the worker travels outside the permissible areas allocated to his role. The system stores employee photos. Job locations, routes, job codes, SIC codes, etc. may be entered into the back end by an administrator. The system also generates reports, and has a "Dashboard" or summary report simply show who is on the jobe, what time they arrived and GPS confirmation of location. The LPM platform may also be operated in the Cloud.

U.S. Patent Disclosure No. 2014/0258057 filed by Chen discloses the use of a system and method for tracking the User's time of a mobile device for the purpose of billing clients. The system is provided with a digital timer which is launched at the time of arrival and then stopped when the employee leaves. The system is directed at tracking time on a mobile device or app. It tracks time sending texts and emails. Time is recorded as soon as the professional receives a voice mail, phone call, text or email. The user can also input notes with the system's time recording and entry. The app automatically looks up in the user's contacts list whether the call or email or text coming in is from a client, and if so, it begins to track it for billing purposes. If not in the contacts registry, the user is alerted at the time and can add the contact as a client to be billed.

U.S. Patent Disclosure No. 2013/0290154 filed by Cherry, et al. discloses the use of the system and method to manage employees at a plurality of jobsites by providing a database wherein a set of job site data is stored therein. Employee devices may collect a set of time punch data and photos to store in the system. Management apps are used on supervisory devices to monitor the job site data and employees and validate photos and activate employee apps. This system is shown operating on a Cloud environment. The app will operate with a web browser, WiFi or on GPS authentication. The system essentially operates as a time tracking system for job sites. The system stores time photos of the employees at check in and check out. The system also records a job number, a job phase and a cost code. The system also has a payroll calculator communicating with a payroll service.

U.S. Patent Disclosure No. 2001/0042032 filed by Chrawshaw discloses the use of a system for capturing, processing and reporting time and expense data which can include flat fee billing, maximum fee billing and will also allow for discounts and write offs. It can be used for a wide range of businesses. A client will not have access to internal data of the company. The system will produce bills, expense reports, time sheets, proposals and project tracking. This appears to be a conventional program for law firm data which is run on a local server for one location. The system may produce various reports as needed. Bills may be delivered by email. The program will create envelopes for the bills. The system will also create budgets for the client.

U.S. Pat. No. 6,038,547 issued to Casto discloses the use of a construction tracking and payment system for use by contractors and subcontractors so that work may be tracked and payment may be timely made after the work is completed and inspections performed. The system complies with AIA requirements. The system may be implemented on a handheld computer. The system will break down a construction job into various elements, and then a contractor or subcontractor will be given a coy of how the site is partitioned, then each contractor or sub is responsible for submitting applications using the partitioning to ensure uniformity the architect desires to impose. The system can import and use CAD information on the job site. The system uses coding approved by the AIA.

U.S. Pat. No. 6,747,679 issued to Finch, II, et al. discloses the use of a time keeping and expense tracking server including a server that implements computer instructions that define logic for building GUI screens according to user instructions. The user can implement and design the screens needed for the tasks of time keeping and expense tracking. The system may be implemented on the Cloud or Internet with a laptop or wireless device desired. The GUI screen may be customized on a company by company basis, a department by department basis, etc. The system also includes security wherein projects and project codes are only viewable by certain level employees.

U.S. Pat. No. 7,343,316 issued to Goto, et al. discloses the use of a network based shift scheduling system for generating temporary shift workers. It is sent over portable terminals over a network. The system is set to secure and provide work for a plurality of workers. Workers can also submit cancellations or shift changes via the system. The system also accommodates email for communication purposes. The system may also recruit new employees. The system stores the name, age, sex address, mail address and qualifications of the employee, the workable time slots, the type of job, hourly wage, etc.

WPO 2014/016796 filed by Gupta, et al. discloses the use of a system and method for employee tracking in a mobile communication device wherein dynamic location reports may be generated in real time or near real time. The system is directed to door to door delivery or pickup sales forces. The System uses a mobile app on the employees cellphone to conduct the tracking of the employee. The system will raise flags if deviations from tracking occur. The system uses Blue Dophil software to analyze where employees should be performing tasks and produces flags when parameters gathered fall outside permissible ranges. These flags are sent to management via text or email.

U.S. Pat. No. 6,832,176 issued to Hartigan, et al. discloses the use of a method and system for tracking and reporting time spent on tasks in different application on the end users' computers while the tasks are being performed. It may track the opening and closing of files automatically and send reports and messages directly to and from other applications. The software may also suggest categories for each task based upon at least one criteria. The system may use MS Outlook for assistance in tracking tasks and transmitting reports. It is directed toward attorneys and accountants. The system may track fixed fees and use data collected for evaluating production or sweat equity bonuses to employees. The system may track a plurality of projects or research endeavors. It can track the time spent by accountants on spreadsheets. It can track the time engineers spend on designing computer code or simulating circuit designs, etc. It mentions the use of Timeslips for professional time tracking and TABS II for tracking other professional time spent on tasks and projects. The system tracks time on computers used by the professionals involved. The system presents toolbars to assist in tracking time. The system will track time spent in applications such as MS Word, Excel, Outlook, Power Point, etc. It will track when the application is open, active and then closed. It can score and rate the usage of these various types of software automatically.

Various reports may be generated by the system for management usage on a periodic basis, as desired.

WPO Patent Disclosure No. 2015/079776 to Hishiki discloses the use of a work state management system that manages clock in times for drivers of vehicles that work overnight shifts and calculates the appropriate breaks for the driver so that the driver is not over tired.

U.S. Patent Disclosure No. 2014/0344,122 filed by Hodgin, discloses the use for billing for time spent in an IM session by a service person wherein the system can automatically bill a project/client by searching for the name of the client or project within a text or instant message or a series or session of same. If the system cannot find the name of a client or project, then the user will associate the IM session with a new project or client so that the client may be billed for the IM session with the client. Or the System may default into a common template for the User's typical instant messaging sessions.

U.S. Patent Disclosure No. 2009/0006228 filed by Hodgin discloses the use of a time tracking system and method similar to the IM system noted above by Hodgin. The Hodgin system will also store a list of prior associations to Projects and Clients that are built on the same or similar words and phrases.

U.S. Patent Disclosure No. 2002/0154122 filed by Jackson, Jr. discloses the use of an improved system for employers, referral agencies, consultants and independent contractors to hire and manage employees and provide tax reports and wage reports. The Jackson, Jr. System may track and manage employees, salaries and experience to provide optimal benefits to the employer. The System produces computerized scheduling, billing, record keeping and payment templates. It provides a listing of invoices for the User to refer to. It consists of providing invoices for contractor services and performs its functions in a cloud based system.

U.S. Pat. No. 8,838,486 issued to Kong, et al., discloses the use of a time manager interface on a communications display device which allows a worker to keep track of her or his time and activities. The time manager keeps track of time spent logging into and out of the system. This was important in years past when boot time were quite long. It discloses the use of scanning in employee badges to track work time. This disclosure is directed toward a system for checking work in and work out time. In one version of an embodiment, the System is located in the field. It discloses the use of GPS in the field to create an audit trail of time worked. Biometric information may be used for the system to identify the worker. It can be used nationwide for multiple local offices. It may be coupled to communicate with employee hand held devices. It can work over WiFi and cellular networks. It can store: DOB, SSN and other employee details. It can be used with a barcode or QRT code. It can be used in connection with microphones, cameras and scanners. For remote sites, the system can check the IP address of the computer or hand held device to ensure security in the system. The system can also be used to check work schedules to lock an employee out of the system when not scheduled. When an employee arrives at a worksite, upon verification, one or more emails or text messages may be sent to management for that site. Employees may view the work schedules of other employees if granted permission to do so. In doing so, employees can request work dates and exchange them with others. The system can differentiate between exempt and non exempt employees. The system can display messages to employees during time in and time out registration.

U.S. Patent Disclosure No. 2012/0278211 filed by Loveland discloses a system for remotely tracking and monitoring Worker's activities via mobile phones or other mobile tracking devices. This system monitors continuously whether or not a worker is present at a worksite.

WPO 2010/11652 filed by Manser discloses a System and Method for tracking employee performance. The Manser system provides a user interface to allow the user to assess the balance of hard skills and soft skills of an employee, evaluate the employee's performance in a plurality of categories and compare the average cost for the job in the marketplace to the cost of the employee being evaluated. The system also analyzes the average cost of a similar job in the relevant marketplace during employee reviews. The program continually monitors the value of an employee to the employer to determine ROI at any given time. The system can be applied to direct hires, contractors, temps or any employee relationship. The system allows the identification of both over achievers and under achievers. The system provides a means by which employees may determine how to get the highest ratings via their work efforts.

EP 2338293 filed by Molotsi discloses a system for time tracking for employers on a mobile computing device. The system involves providing an event manager on a mobile computing device for managing a plurality of events which are then synchronized to a server. The system will automatically track time and estimate time spent on a task by the worker. This system logs events in the user's calendar, in em ails and texts. Timestamps for events and mapping for the events are provided. A client list and data may be provided in one or more files or databases. The system may communicate with a worker's smartphone. The user may be able to open, edit delete, review or manage all automatically created event records. The system may use information in the text, email, calendar, to automatically create a time tracking record for the user. In addition, the system may automatically convert emails, texts, meetings on a calendar to a time tracking event by means of a pop up box to the user.

WPO 2008/061146 filed by Neveu Holdings, LLC discloses a system and method for remote time collection for employee time on job sites. The system can collect an employee's name, picture, title, contact information, health and/or safety information, skill information, etc. The system can also collect for each employee a project name, project identification, location, project start date, project supervisor and detailed comments about project activity. The system can also collect information on vendors, such as name, address, phone, contacts and type of vendor. The system can also use GPS information and compare it with when the employee is supposed to work. The system collects biometric information to identify an employee. In one embodiment, a time collection database is configured to receive, process and store information related to projects such as name, identification, location start date, supervisor, etc; vendor's name, address, number contact, subcontractor type, etc. project supervisors, tasks, employee titles, departments and employee time records. Office data collection may include: job site, task and project information via a wireless connection. Encryption is used to transmit data to and from the remote site. The system may also include a field scheduling module to schedule a job for a particular jobsite and for a specific remote user(s). The user can edit hours and view comments from remote workers. Remote monitoring can record task completion, view management comments and ask for management assistance and crew responsibilities.

U.S. Patent Disclosure No. 2015/0081381 filed by Okoba discloses a system and method for recording time which may be used on a device, software or application. It may be used by logging into a plugin or extension. The time recorded may be exchanged for vouchers which may be redeemed or traded with other members. A user will register with an ID and password to log into the system. The system may record device activity, software activity, application activity, keyboard activity and mouse activity. The user's time spent in the browser or on a video game may be given a redeemable value. A database may store the recorded activity for further analysis. The system will work on computers, tablets, cell phones, television, games, digital books, exercise apparatus, web browsers, mobile apps and video games. Vouchers may represent monetary value, promotions, products or services. User name and password may be stored in system cookies. The system can capture video game or browser activities, keyboard or mobile keyboard activities. The activity spent in the system may translate to purchasing power so that the user may receive optimized value from their activities and the system may deliver purchasing incentives at the right time and place and for the right product or service. A business maybe selected as a favorite from user activity on the system.

U.S. Patent Disclosure No. 2015/0081487 filed by Porter, et al., discloses the use of a time tracking and productivity system including a tracking component to locate an employee to record time spent at various locations. This system is designed to monitor and improve coordination of patient care, and in particular, to limit the number of patient hours a resident physician can work per week. When the rules implemented by the ACGME are violated, strict fines and probations or suspension may be implemented. This system is primarily concerned with tracking an employee's location and work hours. This system can include cloud performance. It is the movement of an employee within predetermined boundaries that will trigger the recording of a new event. It can track time in a patient's room, a brake area, doing paperwork, etc. A GUI is used on handheld devices. The system can also use tags that interact with RF signals. The system records employee info and FRIDA numbers, the resident program director, the resident coordinator, start and end times for resident shifts, house calls, in house calls, night float, etc. If moonlighting is permitted, the system can track moonlighting hours as well. It will store vacation schedules and rotation schedules. The shift log can include a short trip buffer. Automatic warnings of over limit hours are sent to management for the residents via text, phone, email, etc.

U.S. Pat. No. 6,185,514 issued to Skinner discloses a method and system for automatically collecting and analyzing information regarding time and work performed on a computer. It uses a data collector for monitoring certain portions of a worker's computer activity and an analyzer for showing which portions of the activity were continuous work activities, and the system will categorize the work into preset projects and tasks within a project. The information is periodically written to data storage. The system is directed toward telecommuters. The system automatically excludes time where there was no activity on a computer. The system is used to forecast future projects with reduced financial risk. The system includes the automatic documentation of time. The data stored on the system is encrypted so that it cannot be altered by the user. The data collector automatically collects the activity on a mouse and on the keyboard of the computer user. The system creates a log file of work activity. A hardware abstraction layer can interface with phones and other devices and can be used with pointing devices such as a tabled or mouse. The system keeps track of activities within open multiple windows on a computer.

U.S. Pat. No. 8,209,243 issued to Smith, et al., discloses the use of a system for performing real time labor management and timesheet reporting which is adapted to wirelessly transmit timesheet information. The portable devices may be dedicated to tracking time only and cannot perform other computing functions. The system includes a portable electronic punch system that is capable of communicating with the labor management system via text. The system allows user to manage work schedules and report timesheet information without requiring an internet accessible computer. The units send timesheet information directly back to the server for analysis via wireless network. The text messages may contain: employee ID, clock in time, clock out time, break times, days worked, days off and other work related information. New user information may be set up by text message into the timekeeping system. The system may operate over any wireless system, i.e., GSM, GPRS, CDCP, Bluetooth, Wifi, etc.

U.S. Pat. No. 9,020,848 issued to Ridge, et al., discloses the use of a method for tracking time and location of an employee according to a predefined schedule and it may utilize software to track the presence or non presence of: a NFC (near field communication), BLE (Bluetooth Low Energy) or other wireless device. The system will track the presence of an employee in a geofenced area. It will also track employee time and other data to log that into a payroll system. The low energy device then communicates data to a server if a signal could or could not be detected. It will also allow for manual clocking in and out in case of failure of the back end server. The system can also be used for security purposes. The system can function in real time or in batch request mode. The information may be a time stamp, a status or location of a mobile device. In one embodiment, the system can be used for employees for a retail store or restaurant. The system can utilize Bluetooth tapping to log in. It may be used at a trade fair both by tapping the device to a NFC communicator. It maybe used in connection with a mobile time clock app. It can be used to advise management when non authorized employees enter a restricted work zone. Management may input which work zones are restricted and which are not.

WPO Disclosure 2015/029073 file by Shirish discloses a system and method to measure aggregate and analyze time, effort and productivity by reviewing time spent on activities such as calls, travel, lab work, meetings, discussions and remote visits. PD's or Presence Devices may be used to track employee location. The system can track average daily work patterns. It can track work activities and private activities. It can track emails and browsing. It can account for flexible work hours, use of multiple and different types of computing environments (PC at work and home, smartphones, tablets, etc.) It can capture files, folders, web links, etc. It can make all personal endeavors password protected and private. It is intended to track effort and performance 24/7. It can provide modules that promote work focus and minimize distraction by awarding performance points, badges for consistent performance and progress in performance goals. It can measure improvement by creating an n-dimensional effort data cube and include analytics for custom reports. The system can go into self improvement mode to set goals for self improvement and activities related thereto. It can be used at work whenever and where ever. It has a time tracker for all online time. It has a Merger to merge offline and online time effort mapping. It has an interference engine to determine Work Patterns for employees, leave taken, work done on holidays, desk or supervisory or travel oriented job, etc. The System will also present organization goals and analytics, top performers, work patterns, recent deviations from work patterns. A Collector module measures data to improve the exact work effort at the individual level throughout the day. The System can be used on SAS (Software as a Service) and it maybe hosted in a cloud-computing environment.

U.S. Pat. No. 2012/0173297 A1 disclosed by Styn, et al., a method and system for task tracking and allocation is disclosed. The disclosure provides for a method in which an individual may create a set of instructions operable to perform a set of tasks in a computer readable medium. That set of tasks may comprise maintaining a database, generating a first interface displaying subjects associated with individual issues, and a second interface with notes specific to an issue selected by a user. The instructions stored in the database may be implemented accordingly and the computer may maintain a plurality of relationship records containing data indicating relationships across folders. The disclosure also mentions the prior use of MS Project and ERP systems that employ Gantt charts, milestones and tasks and subtasks with complex dependencies. This system keeps track of billable items. However, Van Styn is not a true timekeeping and professional billing system.

US Pat. No. 2014/0108644 A1 disclosed by Zaents, et al., a method and system for tracking time in a web-based environment is disclosed. The method of tracking time involves a web-based application to track time associated with several records. Identifying a record in an active state, generating a record associated with the active record and activating a timer, and having the ability to end the session in response to an indication that the record is an inactive state. The time-tracker may be hosted in a cloud-computing environment. The time-tracker may calculate the entire duration of the record by continuously adding the active times together. The method may detect a predetermined total duration of time has been exceeded and provide such indication to user. This disclosure mentions timekeeping, billing and using a web browser and multiple tabs to record time for multiple clients when a professional is switching back and forth between projects. It is useful for billing, accounting and auditing. More than one user can log into the system on a computer and track time her or his time on the same computer. It also teaches the use of sub-tabs to track time. A stop watch type button is used to switch on and off the time tracking, or time is tracked as the user switches browser windows.

However, none of the above patent disclosures teach or suggest improved billing and timekeeping systems which are able to directly edit work-in-progress sheets, draft and final bills and automatically have those changes reflected in the original work data entries. There are also no timekeeping and billing systems seen in the marketplace that can automatically predict cash flow, partner profits and allow clients to view bills in real time. These and other additional objects and advantages are readily derived from the disclosures and drawings provided herein.

SUMMARY

The present invention consists of improved systems and methods for handling the draft, revision and final bill states for standard monthly bills for professional services, and especially those tasks that relate to providing clients and matters with Budgets and Standard Monthly Bills. In the present invention, generally bills are sent out monthly for professional services and include the time and rate of the Timekeeper, the charges for professional services and disbursements which include fax, copies, postage, travel, meals, etc. Typically, a client will enter into a fee agreement with the professional and the firm where hourly rates are agreed upon, as well as soft and hard costs to be billed to the client. In one preferred embodiment, the following Time Data is recorded by the System to generate a Professional Bill: date worked, work location, region, Timekeeper Name or ID, Timekeeper Rate, Matter Name or ID, Area of Law, Activity, Task, Phase, a detailed Description or Narrative of the Task performed and the hours worked. In addition, the present invention, standard billing and budgets, will accommodate a variety of corporate structures and it is anticipated that when a client is first entered, any relationship to other companies, such as parent, child or sibling will be entered into the System at that time. Each Time Data Entry may have one of the follow status: Billable, Do Not Bill, Hold or Pro Bono. For charges that are Do Not Bill or are put on Hold, these will not be put on the Final Bill, but will be held indefinitely in the System until a decision is finally made to chose Billable or Pro Bono work for the Company or Firm. Pro Bono work, for law firms must meet certain strict guidelines, such as the client is indigent, is on some form of government assistance, such as Social Security or SSI for the disabled, or the Client earns less than 125% of the poverty level, does not own any real property, has a car worth less than $2,500, etc. Some Pro Bono work is to advance civil and human rights and also may be designated as Pro Bono. Typically, these case involve torture or beatings of prisoners, or rights of Free Speech or Civil Rights or anti-discrimination laws for suspect classes.

Once the Client has decided upon the particular Fee arrangement—Hourly, Contingent, Blended or Flat Fee or Capped rate per Matter, then the present Inventive System will automatically generate and transmit the appropriate Agreement to the Client for signature and acceptance. The Present Inventive System and Method can generate an esignature to any Client Agreement and then transmit the document electronically, by fax or email or other electronic means. The Present Inventive System and Method will be able to encrypt any esignature with an unique security code so that the Agreement cannot be forged or altered.

With a flat fee bill, a flat fee code is generated and attached to one or more of the following fields: Client, Task, Activity, Matter, Timekeeper(s) or Working Office. When a flat fee is attached to a Task, Activity or Matter, the flat fee may be billed each time the Task or Activity is mentioned in a bill. This is helpful for repetitive work the law firm does. The Client may provide their own set of codes or use the standard legal UTBMS codes (see, supra). Once a flat fee is assigned to a Matter, the associated Task and Activity codes will appear until the Matter is closed.

Capped fees is an agreement where total of fees and costs cannot exceed an agreed cap which is set against a Matter or Phase. As with flat fees, a flag is sent to the Billing or Client Originating Partner when the Matter or Phase is at or near its cap level. At that point Management may decide to raise the Cap or write off all funds which exceed the Cap.

Business may be automatically projected by the Present Inventive System and Method, and during periods when business is typically low (holiday periods and summer vacations), further discounts may be offered automatically by email to prospective, reliable Clients. Volume or mass discounts maybe made by according to the following fields or criteria: Client ID, Matter(s), Payer ID, Task, Activity, Phase, Client Group, etc.

The Present Inventive System will be able to generate Reports on Discounts, New Clients, New Fee Arrangements, and the like to the Managing Partners, Client Originating Partners and Billing Partners at regular intervals, typically monthly, or as the User of the System requests.

Discounts, Pro Bono hours and Write Offs and Courtesy Credits will all be reported separately to Company Management, either at periodic intervals, or as the User of the System Requests.

In some cases, Clients require Budgets for their professional expenditures, and the Present Inventive System will be able to prepare Budget reports by Matter, Phase, Office Location and Attorney. When the Budget has reached a pre selected level—e.g. 50%, 80%, 90%, 100%, a automatic report may be generated to the Billing Partner who may approve transmission to the Client so that the Client is well informed of the costs of one or more Matters and is not surprised by the next monthly bill and the Client can then make arrangements to meet the Client's own Budget. At this point, the present Inventive System may offer further discounts or incentives to continue with Litigation or a particular Matter rather than drop the Matter entirely. Budget can be used to cap fees by time period: monthly, quarterly or yearly.

The Budget typically consists of Hours per Matter and/or Fees per Matter plus Costs per Matter. The Budget may be changed at any time by the Billing or Client Originating Partner upon request from the Client. The Budget can be set by year, time period, Activity, Matter or Phase. Budgets can be set by the Billing Department, the Billing or Client Originating Partner or any Professional at the firm, according to Security provisions. A budget may be set and attach to the Working Office, or one or more Timekeepers, or staff level, etc. or any combination of: Matter, Phase, Activity, Timekeeper(s), staff level and Working Office. Matter budgeting can be revised at any time during the life of the Matter. Budgets can be set in Matter currency or Firm currency. Or the client may elect to make an offer of work and send a proposed Budget for work to the Firm or Company using the Present Inventive System from the Client's online account with the Firm or Company.

A Report may be generated to the Client comparing the predicted Budget expectations versus actual performance in terms of hours spent and billings for the Project or Matter(s) involved. The Budget Report, together with Payments made by the Client may be automatically reviewed by Management to obtain better pricing to the Client.

A Budget may be prepared in one or more currencies. In one preferred embodiment of the Present Inventive System and Method, the Client is provided with an online or internet based account where the Client is able to run, adjust and override the Client's own Budget Reports in real time or near real time. The Client may send notice to the Professionals involved in creating and implementing the Budget, as well as those Professionals working on the Project or Matter for the Client.

Security may also be implemented in the Present Inventive System wherein only certain employees with the desired security clearance may review the rates or budget of the Client, typically the Billing Supervisor, Managing Partner and Client Originating or Billing Partner. Some Companies may have a staff member who also analyzes pricing and profitability or Pricing Director and this employee will also be provided access to such billing and rate data to optimize profits and business to the Firm or Company.

After Time Data has been entered into the Present Inventive System for the month in question, typically a listing of all Time Data Entries are reviewed by the Billing or Client Originating partner in a format typically referred to as Work in Progress or a WIP Sheet. After the WIP Sheet has been edited, revised and formulated into the approved final configuration, then Draft Bills according to each Client, are then sent to all staff and attorneys requesting them by client. These Draft Bills are sent to the Billing Coordinator, if any, and the Managing Partner and the Billing and/or Client Originating Partner for review, possible revision and then, upon approval, the Present Inventive System will generate a Final Bill for review.

The User can also change the Bill Format at any time, adding or deleting columns on the Bill which are displayable to the Client such as the ID of the Timekeeper, Task, Activity, Work Location, Client Group, etc. In the Draft format, the User will be able to switch back and forth between billing in tenths of an hour, to quarter hours, to a flat fee and generate a Draft Bill to show to the Client. The User thereof will also be allowed to change the Timekeeper Rate at this stage of billing.

Draft Bills, like Final Bill, will be able to show Retainer Funds, Allocated Funds (those applied to certain invoices) and Unallocated Funds (which have not been applied to any funds). The User will also be able to generate a Retainer Invoice to a client upon request, and without the payment of any money, and all Retainer Invoices will be stored separately and will not generate any monthly Bill unless and until the Client makes a payment to satisfy the Retainer and/or Time Data is entered into the System. Once Time Data is entered in the Present Inventive System, this will trigger the issuance of a Monthly Bill until the Bill is paid in full. After a Retainer is received, this likewise will trigger the issuance of a Monthly Bill until the Client's balance is zero. The System will also run Retainer Funds reports to Management for any Retainers which are over 30 days old and for which the Billing Attorney and/or Client Originating Attorney has not done any work for the Client. Management can then inquire into the matter so that work is completed promptly so that funds can be moved from an IOLTA or trust account into the firm's operating account.

As a Monthly Bill moves through the various stages, from WIP to Draft to Final, the present Inventive System will keep an Audit Trail of all changes made to the bill to ensure that changes are not made inappropriately by the wrong employees. The present Inventive System will also keep track of the various approvals needed by the Billing Attorney, Client Originating Attorney, Billing Supervisors, etc. to get the Bill to the client The present Inventive System has the ability to release all Time Work data for a particular Client, Matter, Task or Activity to or from Hold, Do Not Bill, Billable or Pro Bono. The present Inventive System will also set up naming conventions for Clients, Activity, Task or Matter. There can be up to one Lead Matter per Joint Group of Clients.

With the Present Inventive System and Method, a WIP Sheet will be provided to the Professional in a form wherein the Reviewer will be able to edit and make changes which are reflected in the System in real time or near real time and the original Time Data entered is revised simultaneously. The same is true for the Draft Bill and even Final Bill which may be revised by the Reviewer in question. When changes or revisions are made to any of the following, the changes are directly entered into the System in real time or near real time: Work Date, Timekeeper ID, Matter, Activity or Task ID, Narrative or Detailed Description, Rate and Hours Worked and Costs Billed to the Client. The Reviewer will also be able to combine Narratives for the same Work Date, as well as alter the Hours Worked and Costs Billed. The Reviewer will also be able to change the following status for every Time Data entry: Billable, Hold, Do Not Bill, Pro Bono. Courtesy credits and Write Offs are applied after a Final Bill has been generated to the Client.

The Present Inventive System is also able to generate Joint Bills with Multiple Payors. These bills can be sent either electronically, or posted in the Client's Account with notice to the Client or they may be sent by regular mail, USPS. When a bill is generated by an electronic means, the bill may be send with a password protected file to the client, or a link may make it viewable on the internet when a password is entered. Where there are multiple Payers, the total for all Payers must be 100%; however, some Payers can pay a flat amount per month, with other Payers paying the remaining balance.

The Present Inventive System is also intended to comply with, and take advantage of the UBMTS System set forth by the American Bar Association which is disclosed at: http://www.americanbar.org/content/dam/aba/migrated/litigation/utbms/utbm-s.authcheckdam.pdf and which is incorporated by reference, as if fully set forth herein.

When a Cap on any Client Billing Matter, Task or Activity has been achieved, or a goal preselected by the Client has been achieved (e.g., typically 80%, 90% or 100%), an automatic notification will be sent to the Managing Partner, Billing or Originating Partner and/or the Client so that any adjustments necessary may be promptly achieved.

E-bills may be sent in one or more of the following formats, as desired by the User or Client: Word, WordPerfect, Open Office, Google Documents, Excel or Quattro Pro Spreadsheet, PDF, jpg, etc. or any format preselected by the Client in the Client's online account. The Present Inventive System will also be able to generate bills by Joint Groups of clients which have been pre-selected and entered into the System.

It is anticipated that all E-bills will also be provided with an e-invoice which will direct the Client to one or more of the following e-payment systems for further action: Paypal, Chase Quick Pay, Bitcoin, or any other e-bill payment system commonly available in the relevant marketplace. Or, the Client may select to send an ACH payment or wire transfer or generate an electronic check from the Client's online account with the firm.

It is further a feature of the present Inventive System and Method that during the generation of WIP sheets, Draft and Final Bills, the electronic version of these items will allow the User thereof to perform the following functions: spell check, search and replace any words or phrases, change any fields entered in the Time Data originally entered, as well as the final billed amount in fees and costs to the Client. Once a Client has been created with a Client Name, Company or Firm Name, address, website, etc., the spelling of each of these will be utilized in the spell check additional words associated with each Client in the System as an User is entering new Time Data or Cost Data into the present inventive system.

After Time Data has been Entered the User thereof may generate a bill at any time. If the Bill is generated at the End of Month (EOM), then the User thereof will be able to upload the bill into Draft format for further revision. Once the Draft Bill has been reviewed by all Partners involved in the Bill for that Client, then the Bill will be generated as a Final Bill and the EOM accounting will be automatically updated for that Client.

It should be observed that there are numerous configurations, options, additions and rearrangements of elements found in the prior art which are considered obvious to try and which should be considered as part of the summary of the present invention as if fully set forth herein. For example, the present invention is well suited and readily adapted to the Swiss Verein structure of business associations, as has been mentioned above, in the US, the present invention readily accommodates parent, child and sibling corporate structures.

Objects of the Invention

Thus, it is one primary object of the present invention to provide an improved monthly billing system for professional companies which tracks time worked, hours worked and rate for one or more Timekeepers, as well as costs, and generates a bill in two or more currencies.

An additional primary object of the present invention is to provide an improved monthly billing system for professional companies which tracks time worked, hours worked and rate for one or more Timekeepers, as well as costs, and generates a bill containing Time Values which may be flagged in one or more status conditions: Billable, Do not Bill, Hold or Pro Bono. Bills which are on Hold status will not show on either a draft or final bill until they are released by authorized personnel.

Still a further primary object of the present invention is to provide an improved monthly billing system for professional companies which tracks time worked, hours worked and rate for one or more Timekeepers, as well as costs, and generates a bill which contains budget data according to a preselected Time Period, Phase, Matter, Activity or Client Group.

Yet an additional primary object of the present invention is to provide an improved monthly billing system for professional companies which tracks time worked, hours worked and rate for one or more Timekeepers, as well as costs, and generates a bill containing a budget and automatic notices to both Management and the Client when any fee and/or costs has risen to a pre selected level. Typical levels would be: 50% of budget, 75% of budget, 90% of budget and over budget.

A further primary object of the present invention is to provide an improved monthly billing system for professional companies which tracks time worked, hours worked and rate for one or more Timekeepers, as well as costs, and generates a bill containing a budget and automatic reports to Management indicting a preferred course of action when a Matter, Phase, Client, Activity, Task, Client Group, etc. is near budget or over budget indicating the best course of action.

Still an additional primary object of the present invention is to provide an improved monthly billing system for professional companies which tracks time worked, hours worked and rate for one or more Timekeepers, as well as costs, and generates a notice to both the Client and Company Management when a Matter, Phase, Client, Activity, Task, Client Group, etc. is near budget or over budget to optimize profitability to the firm by suggesting either additional fee cuts, cost cuts, or other manners to retain the client and ensure prompt payment.

Yet a further primary object of the present invention is to provide an improved monthly billing system for professional companies which tracks time worked, hours worked and rate for one or more Timekeepers, as well as costs, and generates a bill containing one or more of the following columns: Work Location, Work Hours, Work Date, Narrative or Detailed Description, Timekeeper ID/Name, Timekeeper Rate, Work Value, where the user may add columns or delete columns in the on screen draft bill format in order to produce a final bill.

Still an additional primary object of the present invention is to provide an improved monthly billing system for professional companies which tracks time worked, hours worked and rate for one or more Timekeepers, as well as costs, and generates a bill and a budget in two or more currencies.

A further primary object of the present invention is to provide an improved monthly billing system for professional companies which tracks time worked, hours worked and rate for one or more Timekeepers, as well as costs, and generates a bill and a budget wherein only certain employees, by employee level, or by job title or by Timekeeper ID may view budget and billing data for enhance security to the Client.

Still an additional primary object of the present invention is to provide an improved monthly billing system for professional companies which tracks time worked, hours worked and rate for one or more Timekeepers, as well as costs, and generates a draft bill and final bill where the User thereof may switch between the following billing scenarios to the client: flat fee by Matter, Task, Activity or phase; hours spent in tenths of an hour or quarter hours, as desired; and change the Timekeeper Rate(s).

Yet a further primary object of the present invention is to provide an improved monthly billing system for professional companies which tracks time worked, hours worked and rate for one or more Timekeepers, as well as costs, and generates a draft bill and then a final bill which may be edited by various personnel, and the system will keep an audit trail of any user making changes, the date of the change and the type of change made.

An additional primary object of the present invention is to provide an improved monthly billing system for professional companies which tracks time worked, hours worked and rate for one or more Timekeepers, as well as costs, and generates a bill for review wherein the User may apply a mass or volume discount by Client, Matter(s), Payer ID, Task, Activity, Phase or Client Group.

Yet a further primary object of the present invention is to provide an improved monthly billing system for professional companies which tracks time worked, hours worked and rate for one or more Timekeepers, as well as costs, and generates a bill which may be transmitted to the client with a password preselected by the client, or a link may be sent to the client which will allow the bill to be viewed after the client has entered a password to view it.

Still an additional primary object of the present invention is to provide an improved monthly billing system for professional companies which tracks time worked, hours worked and rate for one or more Timekeepers, as well as costs, and generates a bill to multiple Payers which have been pre selected by the client. The total to be paid by all Payers is 100%.

Additionally, a further primary object of the present invention is to provide an improved monthly billing system for professional companies which tracks time worked, hours worked and rate for one or more Timekeepers, as well as costs, and generates a bill in one or more of the following electronic formats: MS Word, Corel WordPerfect, Open Office, Google Documents, Excel, Quattro Pro, PDF, jpg, bmp, etc.

Yet a further primary object of the present invention is to provide an improved monthly billing system for professional companies which tracks time worked, hours worked and rate for one or more Timekeepers, as well as costs, and generates a bill which may be paid by the client in one or more of the following e-payment systems: Paypal, Chase QuickPay, Bitcoin, wire transfer, ACH payment, and electronic check creation system, etc.

An even further primary object of the present invention is to provide an improved monthly billing system for professional companies which tracks time worked, hours worked and rate for one or more Timekeepers, as well as costs, and generates a bill which is spell checked with a Client's name and address and other words which were entered into the inventive System at or near the time this data was first entered into the System.

These and other objects and advantages of the present invention can be readily derived from the following detailed description of the drawings taken in conjunction with the accompanying drawings present herein and should be considered as within the overall scope of the invention.

BRIEF DESCRIPTION OF THE DRAWINGS

FIG. 4 is a screen shot illustrating one preferred embodiment of the present inventive system, Improved Standard Billing.

FIG. 5 is a screen shot illustrating one preferred embodiment of the present inventive system, Improved Standard Billing.

FIG. 12 is a screen shot illustrating one preferred embodiment of the present inventive system, Improved Client Budgets.

FIG. 13 is a screen shot illustrating one preferred embodiment of the present inventive system, Improved Client Budgets.

FIG. 14 is a screen shot illustrating one preferred embodiment of the present inventive system, Improved Client Budgets.

FIG. 15 is a screen shot illustrating one preferred embodiment of the present inventive system, Improved Client Budgets.

FIG. 16 is a screen shot illustrating one preferred embodiment of the present inventive system, Improved Client Budgets.

FIG. 17 is a screen shot illustrating one preferred embodiment of the present inventive system, Improved Client Budgets.

FIG. 18 is a screen shot illustrating one preferred embodiment of the present inventive system, Improved Client Budgets.

FIG. 19 is a screen shot illustrating one preferred embodiment of the present inventive system, Improved Client Budgets.

DETAILED DESCRIPTION OF THE DRAWINGS

Figure 1:
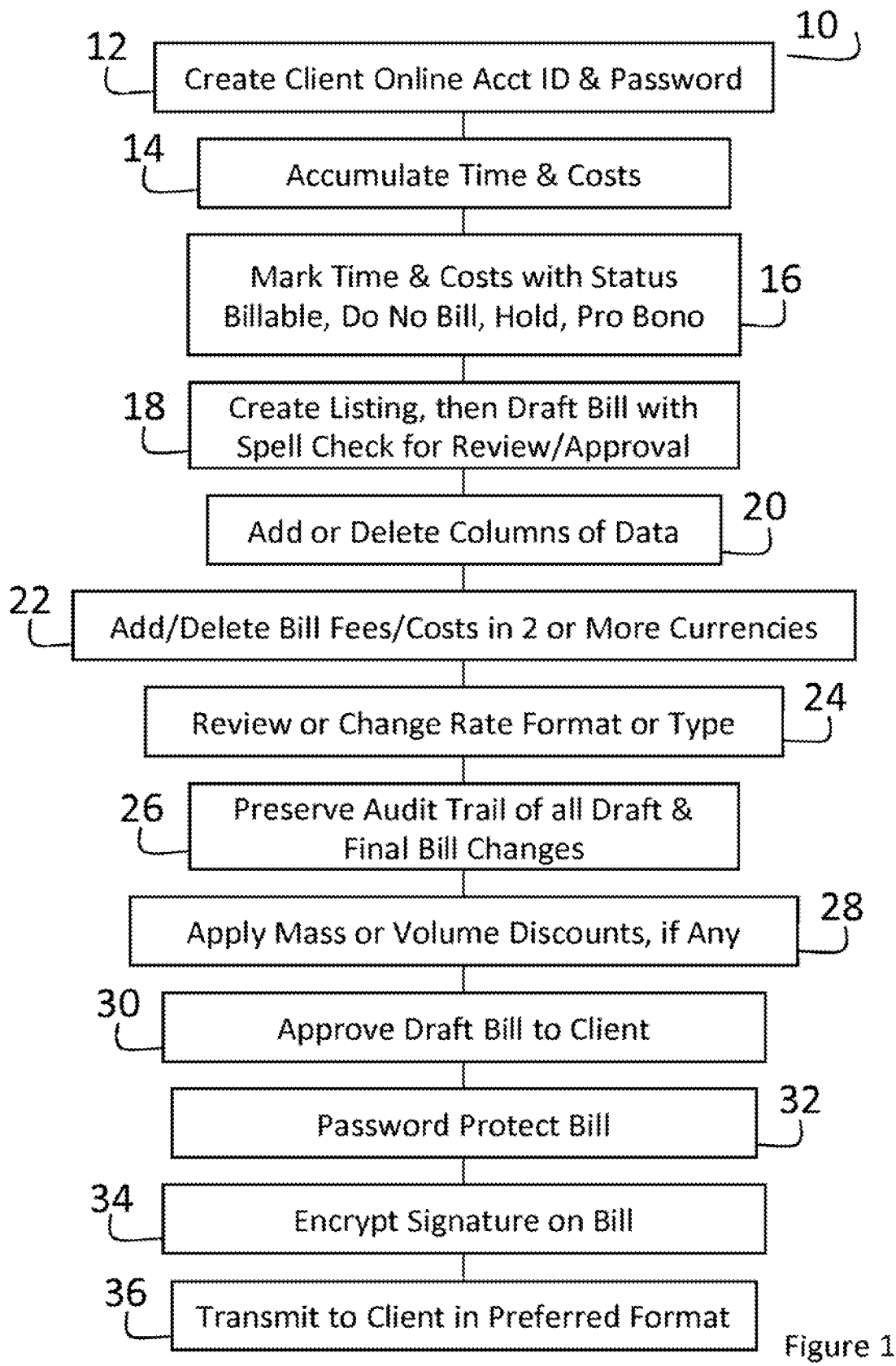
FIG. 1 is a flow chart illustrating one preferred embodiment of the present inventive system, Improved Standard Billing.

Shown now in FIG. 1 is a flow chart of the present invention, Standard Billing System and Method 10 illustrating that in one preferred embodiment, the client first creates an online account and selects an ID and a Password 12. Or, the Company or Firm may create the online account for a Client and transmit this information to the Client. Typically, a new client is set up with at least one Matter with a Task and Activity. Also, a Phase and Detailed Description is often added. Next, work is done, and the account accumulates Time Worked Data as well as Hard Costs and Soft Costs and Taxes attributable to the Client's Bill 14. With every Time Data Entered step, the Time Data Summary will be provided with one of the following status conditions: Billable, Do Not Bill, Hold or Pro Bono 16. When time is placed on Hold or Do Not Bill, the Time Data Summaries are held unless and until the Timekeeper and/or Management releases that Time Data to be billed. Until then, they accumulate and regular reports are sent to Management for unbilled time until the situation is resolved.

Next, when all the Time Data for a particular time period has been properly entered into the Improved Standard Billing System 10, a Time Data in Progress or Time Data Summary Listing is generated to the Billing Department, Management and the Timekeeper and Billing Attorney and/or Client Originating Attorney for review and edits. After this has been accomplished, then Draft Bills are generated with spell check flags, for review and approval by each of the Billing Department, Management, the Timekeepers for the Client and the Billing Attorney and/or Client Originating Attorney 18. The spell check data base will consist of the Client's name and address which was previously entered into this data at or near the time the Client's information was first entered into the Present Inventive System.

Next, the User of the system will be able to add or delete the columns of information appearing on the draft bill 20, typically: the Timekeeper ID, the Timekeeper Rate, the lines of Detailed Description or Narrative showing can be limited to one line or just a few lines, the Task, Matter, Activity, Phase, User set Field(s)—all can be added, deleted or altered in a Draft Bill. The rows which can be added or deleted to a draft bill include: Bill and Payment aging, totals for Write Offs, Courtesy Credits, Pro Bono work, Work on Hold, or any other accumulated billing. These amounts may be totaled by year, year to date, by month, quarter or other custom time period, as set by the client. In addition, if the Client has any billing data (Matter, Phase, Activity, Task) which is subject to a Budget or Fee/Cost Cap, the rows indicating the Budget amounts applied to each Matter, Task or Activity, etc. are shown at the end of the Current Bill and these likewise may be added, deleted or altered by the User thereof.

The next step is to review the Bill format currencies which are present on the bill, and to add, delete or alter the exchange rate for payment thereof 22. With the present inventive system, Improved Standard Billing 10, a Draft and Final bill may show the totals in two or more currencies, as requested previously by the Client, or as Management has determined will be most beneficial.

A further step, is to review the Rates charged on the Draft Bill and to add additional Rate formats, or alter the rate being charged 24. For example, the Draft Bill may show a general rate for each Timekeeper; however, the Timekeepers may have worked on litigation rather than transactions, and the Draft Bill in fact qualifies for a higher litigation rate. At this point, the Use may alter the general rates shown for each Timekeeper to the higher Litigation Rate. Or, the Client may have recently asked for, and obtained Matters, Tasks, Activities, etc. at new codes flat fee rates which are lower than what is on the Draft Bill and the User will be able to view the Draft Bill in a number of alternative rates, including a Flat Fee or Capped Rate. In addition, at this point, the Bill Value calculated may have been done in tenths of an hour, but perhaps the Client has agreed to quarter hour billing, or this is typical in this jurisdiction, or the courts permit it. In such a case, the User can switch between tenth of an hour billing to quarter hour billing and vice versa and determine the effect upon the Bill Total.

A further step is to keep an Audit Trail of all changes to each of the Data Entry Work in Progress Summary Listings, the Draft Bills and the Final Bills to determine who made any changes, which changes were made and on what date the changes were made.

Of course, security levels may be applied to the entire process by limiting access to each of the Data Entry Summary Listings, Draft Bills and Final Bills by either the employee level of the User seeking access, the ID of the User or the Client Group or Work Location.

In any stage of bill processing (Work Data Summary Listing, Draft or Final Bills) the User or Reviewer may apply group or volume discounts 28 by one or more of the following fields in the System: Client Group, Client ID, Matter, Phase, Activity, Type of Law, Task, etc.

After the Draft Bill has been approved by all the interested parties, generally the Billing Department, Management, each Timekeeper on the Bill, the Billing Attorney for that Client and the Client Originating Attorney, then the bill is rendered in Final form and it is reviewed and where necessary, altered one last time before it is released to the Client 30. If an electronic signature is required, it may be encrypted with hidden coding so that the document cannot be altered by the recipient or viewer thereof 34. A Final Bill will then be prepared in any and all formats requested by the client including, but not limited to: MS Word, Corel WordPerfect, Open Office, PDF, JPG, Excel, Quattro Pro, etc. 36. The Final Bill then will appear either in the Client's online account and a general notice that the Client's bill is ready for review can be sent by email, text, FaceBook, Twitter, Instagram, SMS Texting, or any format pre selected by the client 36. Or the Client may be sent an internet link which is password protected with a password pre selected by the Client or Management 32.

Figure 2:
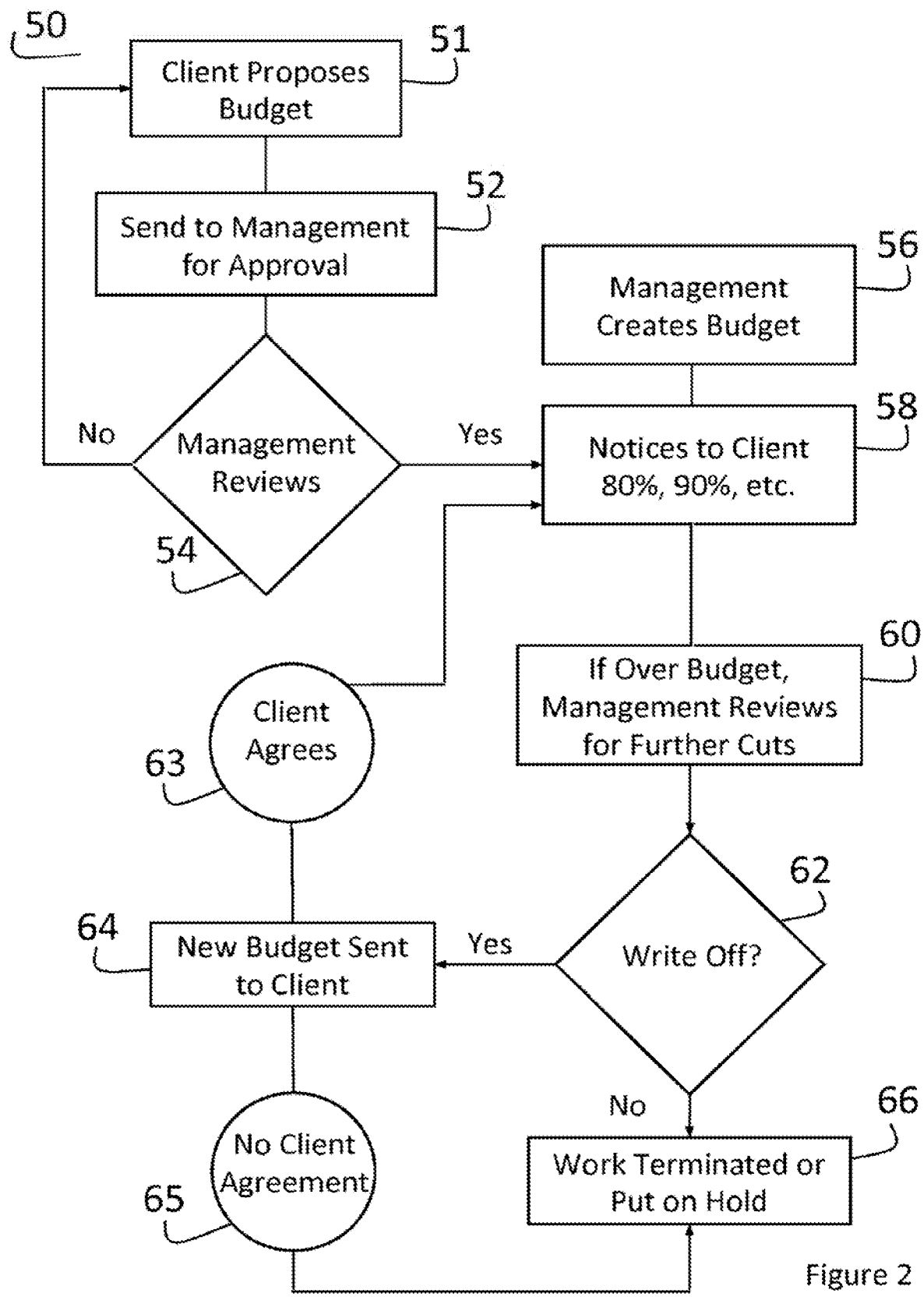
FIG. 2 is a flow chart illustrating one preferred embodiment of the present inventive system, Improved Client Budgeting.

Shown in FIG. 2 is flow chart for the present inventive Method, Improved Client Bugeting 50. In one preferred embodiment, either the Client or Management will create and propose a budget for the professional services to be undertaken by the Company or Firm. In the first instance, the Client may provide a Budget 51 by a Matter, Task, Activity, Phase or Work Location for a given period of time, which may be monthly, quarterly or yearly. This Budget proposed by the client is then sent to the Company or Firm Management for Approval 52. If the Budget is approved, it is then set up into the present inventive system, Improved Client Budgeting 50 and the field involved—Matter, Task, Activity, Client ID or Work Location is then coded with a flag to ensure that this criteria does not go over budget without first sending both Management and the Client (as well as others designated by the System) the appropriate notices that the Criteria involved (Matter, Task, Activity, Phase, etc.) is approaching Budget, at Budget or over Budget. Typically these flags or notices are sent at the 50% mark, 75% mark, 90% mark, and 100% mark to the appropriate preselected Reviewers 58, including the Client. Once the Criteria has reached the 100% mark or is nearly at it 60, Management can then designate the excess time as a Write Off, Courtesy Credit or Pro Bono Work, as desired 62, and the Work may continue to the next revised Budget amount, which has been sent to the Client for approval 62. If the Client does not approve of the new Budget amount 65, and Management or the appropriate Reviewer is not willing to write off the time or otherwise dispose of it, then appropriate notices will be sent to the Client that no work can continue, the matter is over budget and write offs have not been approved and new counsel must be sought, or the work is put on hold 66. If the Client approves the new Budget amount 63, then the New Budget is entered into the inventive System 50 and new benchmark notices will be sent to the client, as agreed upon 58. All of this is automatically generated by the System with minimal work intrusion upon the Timekeepers and Billing Entities and Billing Department, to keep client costs down and optimize profitability.

Figure 3:
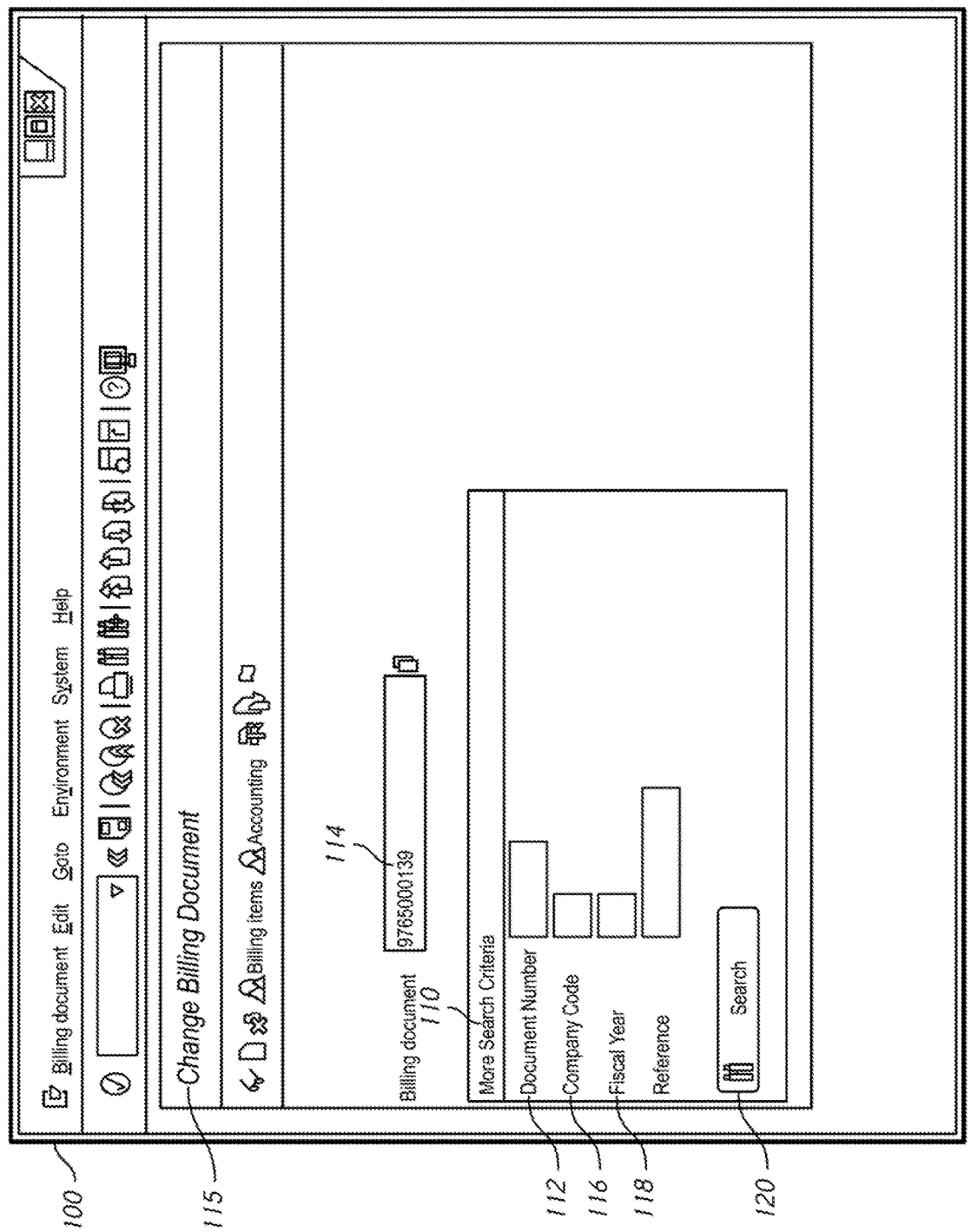
FIG. 3 is a is a screen shot illustrating one preferred embodiment of the present inventive system, Improved Standard Billing.

FIG. 3 shows screen snapshots for preparing a typical Standard Final Bill for Improved Standard Billing Method 100 illustrating the initial screen for Improved Standard Billing System 100 which shows a pop open box which appears after the User chooses a Menu item "Go To" and then Transactions: VF02, and then the final bill document number and then the User must hit "Enter." The Billing Document Number is an unique document for the Final Bill. Shown in the pop open "Change Billing Document Box 115 are fields for the following: Billing Document field 114, Search Criteria Header 110, Document No. 112 for an additional search, Company Code 116, Fiscan Year 118 search field and the Search Button 120.

After searching and hitting Enter, the next pop open box appears, as shown in FIG. 4, for Improved Standard Billing System 100, with the title Final Invoice, No. X, Change: Overview of Billing Items 122 together with Final Invoice field 124, Net Value Field 126, Payer ID 128, Bill Date 130, a listing of Items in Bill 132, Description Field 134, Hours Billed Field 136 ad Net Value 138 of Bill. The Net Value may be displayed in one or more currencies for payment convenience of the Client.

Figure 5:
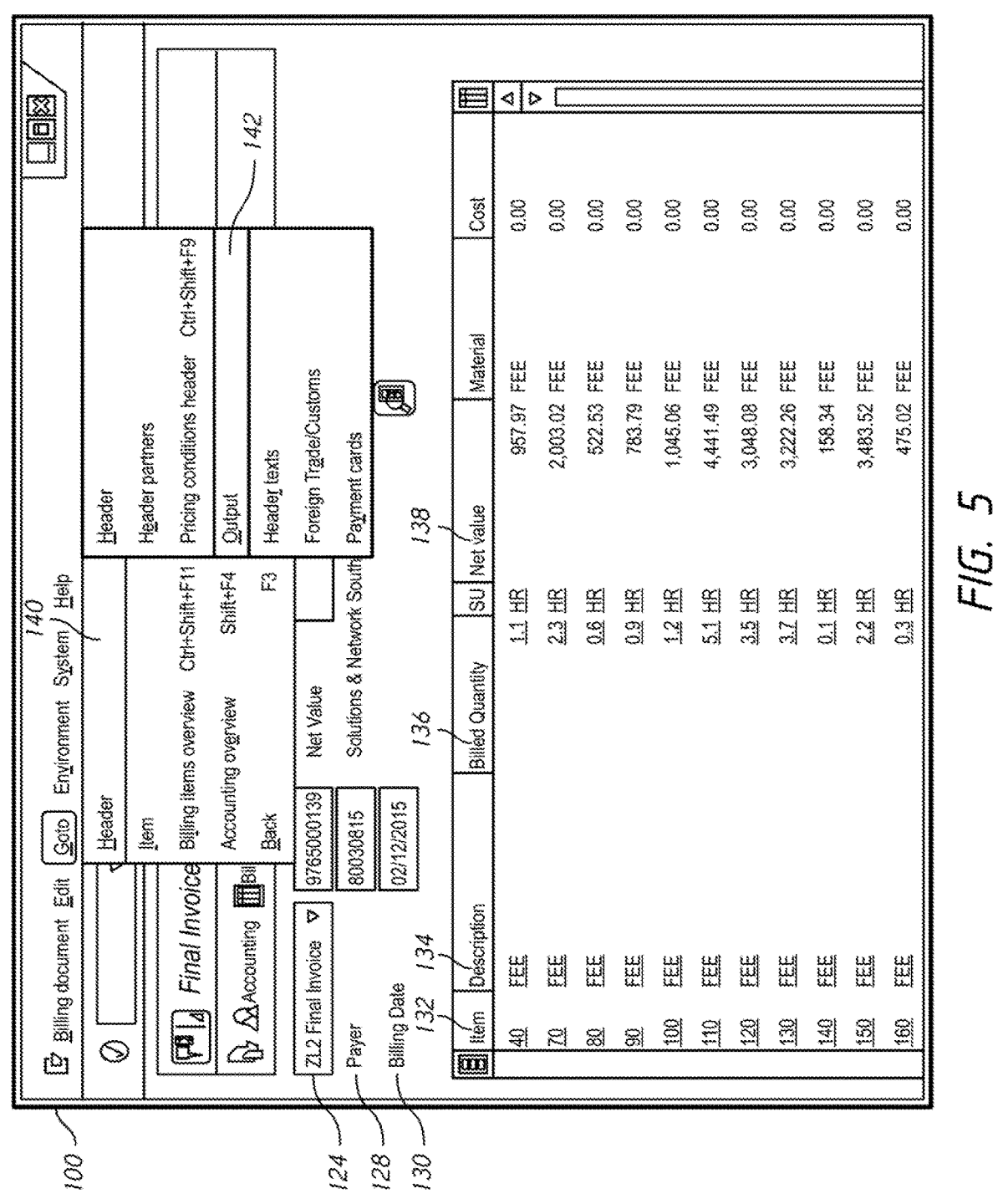

After selecting the Final Invoice number in the screen shot shown in FIG. 4, the User will then click on "GoTo", then Header and Output. The screen shown in FIG. 5 will then appear which shows the following items: Improved Standard Billing System 100, Drop down menu box 140 which, after clicking on "Header", a second drop down box 142 will appear, and the User will choose Output. Direct Access can also be attained by using a short cut, "Shift+F8". FIG. 5 also shows Final invoice number field 124, Payer ID field 128, Billing Date field 130, a listing of Item numbers Billed 132, a Description of the type of item billed, Description field 134, Billed Quantity Field 136 showing a listing of item hours billed, Net Value field 138 showing the value of each item billed.

Figure 6:
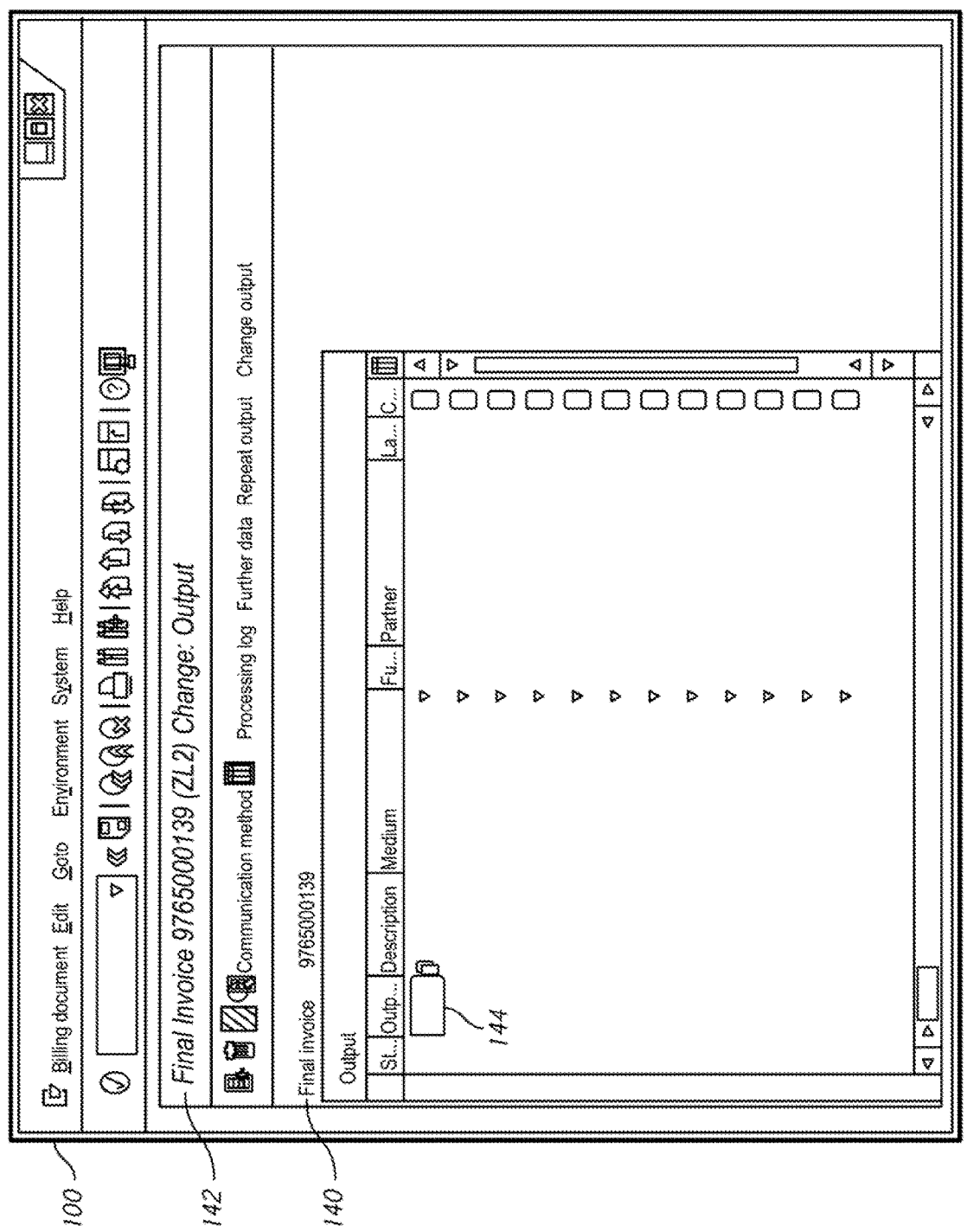
FIG. 6 is a screen shot illustrating one preferred embodiment of the present inventive system, Improved Standard Billing.
Figure 7:
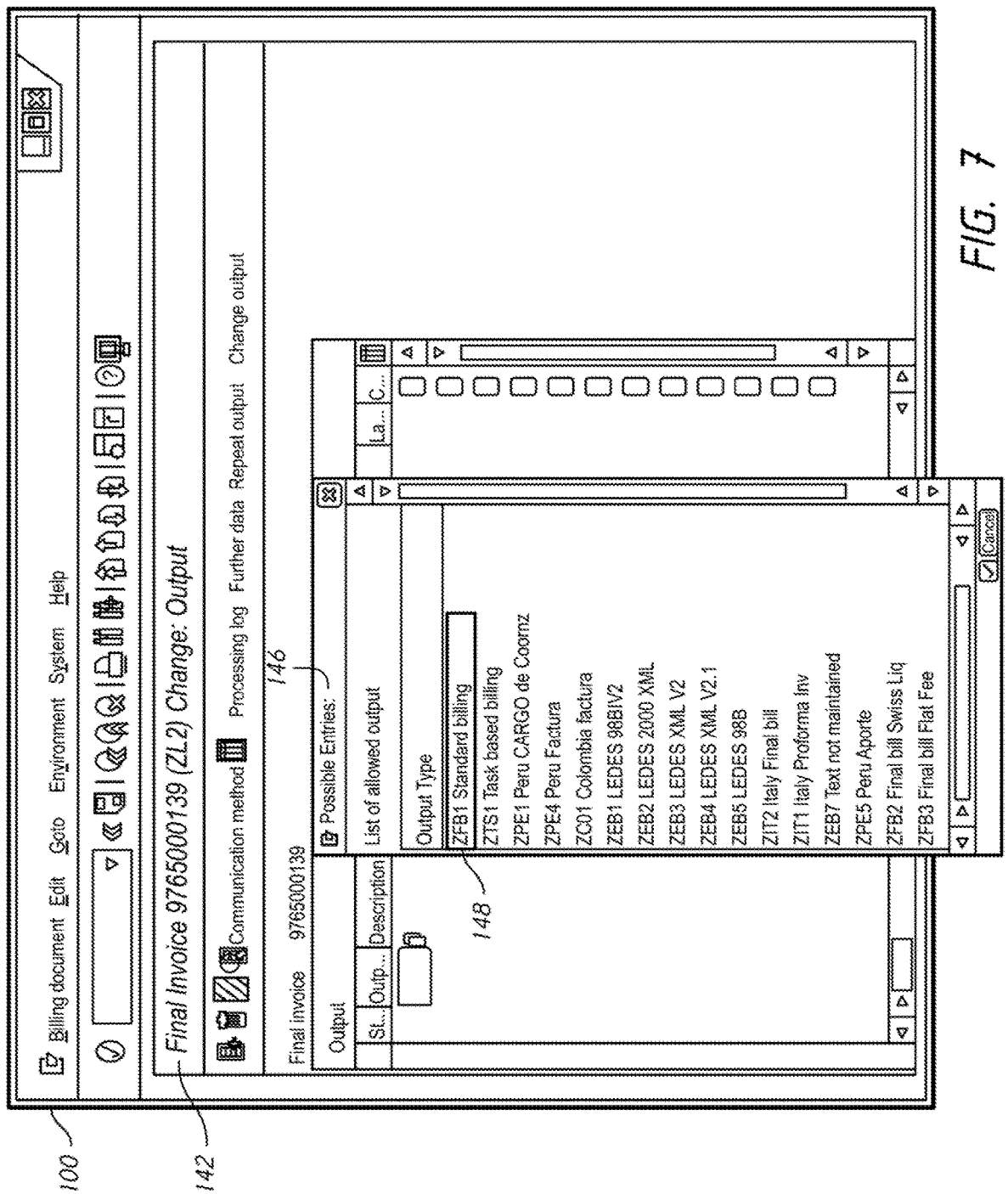
FIG. 7 is a screen shot illustrating one preferred embodiment of the present inventive system, Improved Standard Billing.

FIG. 6 shows the screen shot for Improved Standard Billing System 100 after the "Output" field has been clicked on. Also shown in FIG. 6 are Final Invoice, X, Change Output header 122 and the "Output" field box 144. At this point, the user can select the print format to send to the client or customer (ie, paper bill, email of bill, fax, website, client's online account, etc., as previously selected by the Client or Customer or Firm on behalf of the client). FIG. 7 shows the next screen shot for Improved Standard Billing System 100 showing Final Invoice X Change Output Header 142 together with the popout box 146 where the user is choosing "Standard Billing" Menu Item 148. The user will then hit enter and save and the Final Bill will get saved.

Figure 8:
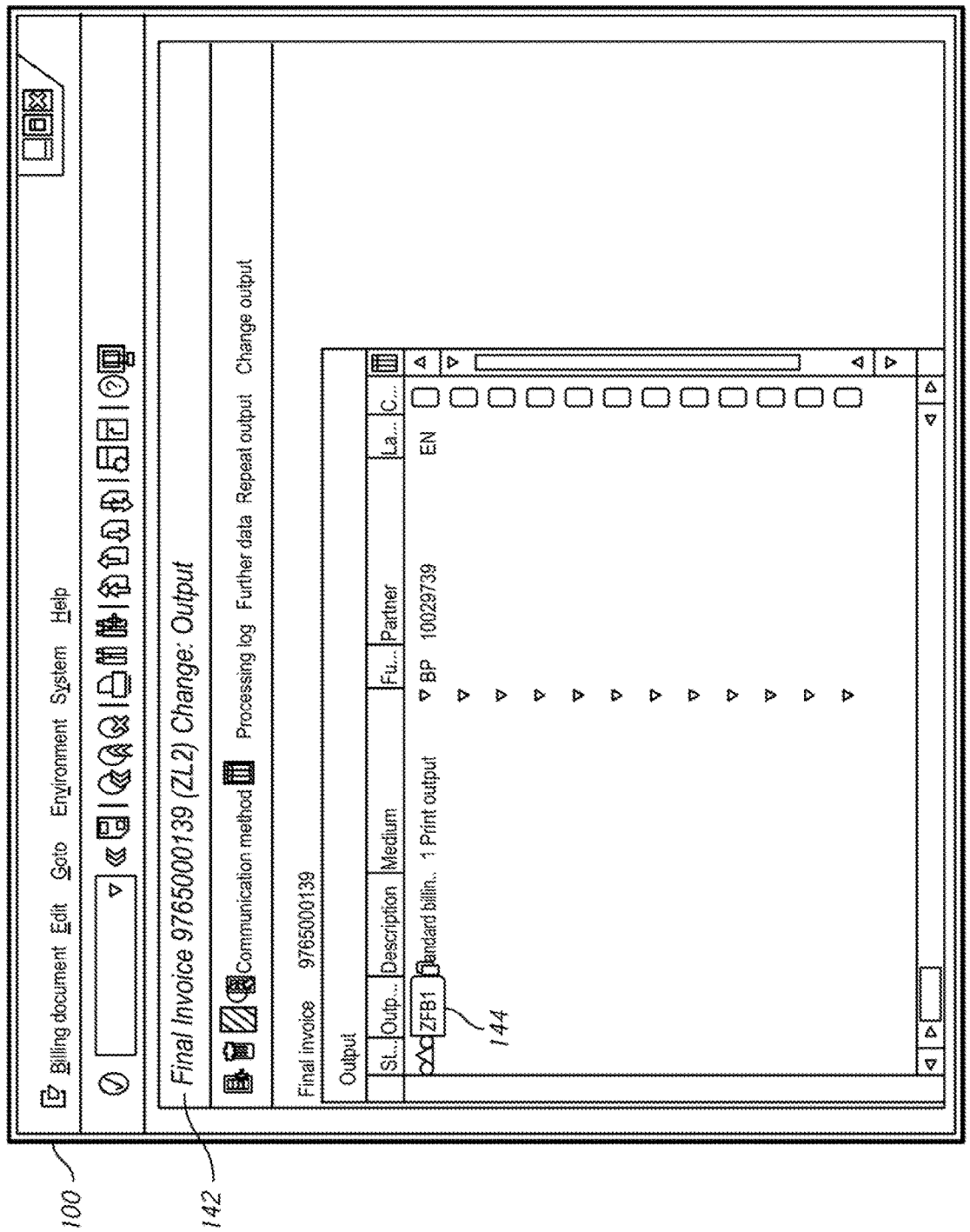
FIG. 8 is a screen shot illustrating one preferred embodiment of the present inventive system, Improved Standard Billing.

FIG. 8 shows the next screen shot for Improved Standard Billing System 100 having "Final Invoice X Change: Output" Header 142 and also showing the Output field box 144 where the User has chosen a template for a Final Bill. The User will then click on the Back Button.

Figure 9:
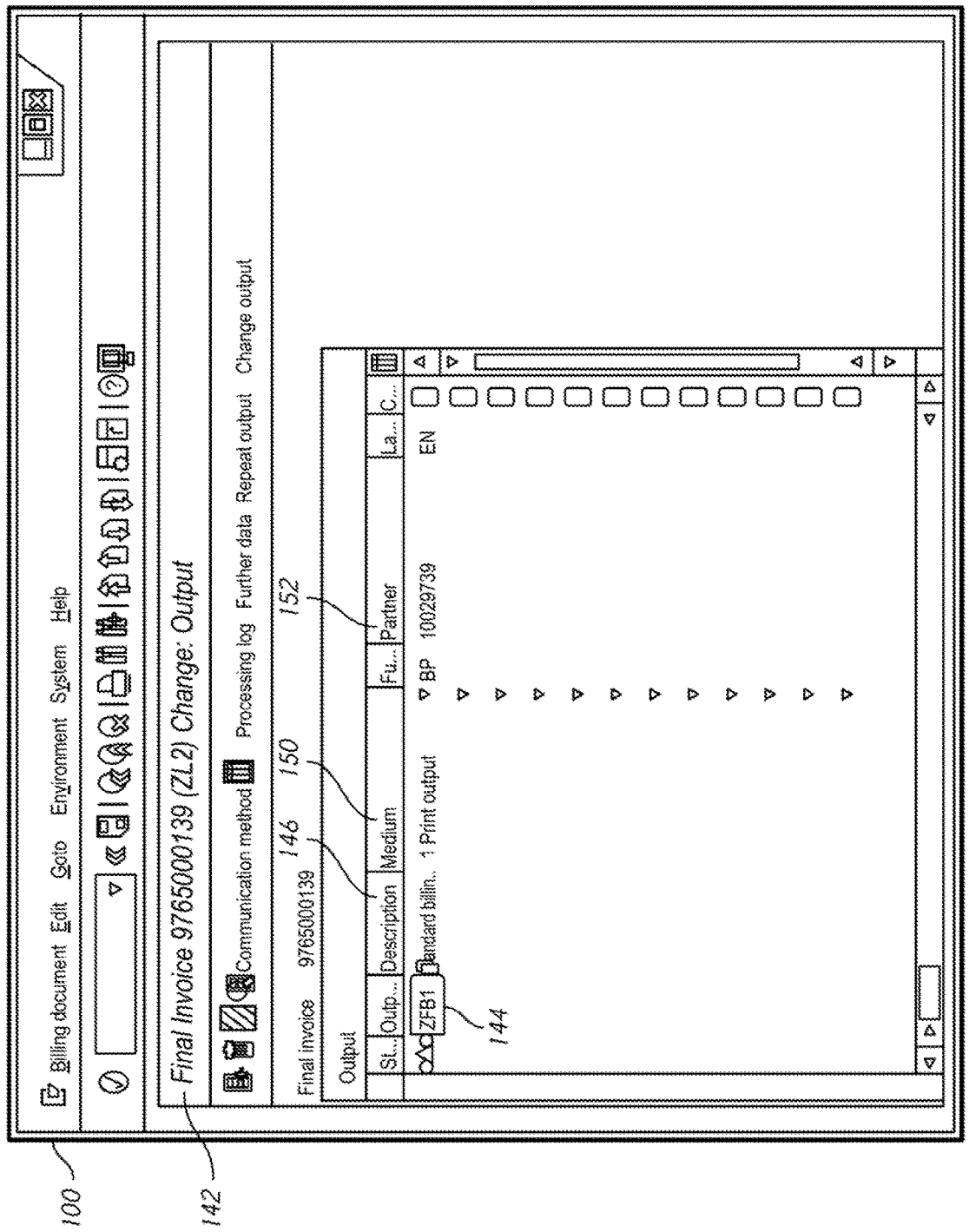
FIG. 9 is a screen shot illustrating one preferred embodiment of the present inventive system, Improved Standard Billing.

FIG. 9 shows the next screen shot for Improved Standard Billing System 100 having "Final Invoice X Change: Output" Header and the following fields: Output 144, Description 146, Medium 150 (paper, email, fax, website, client account, etc.) When the bill is printed to the Firm or other website the client will be provided with a secure link and a password. This view also shows the Partner ID field 152.

Figure 10:
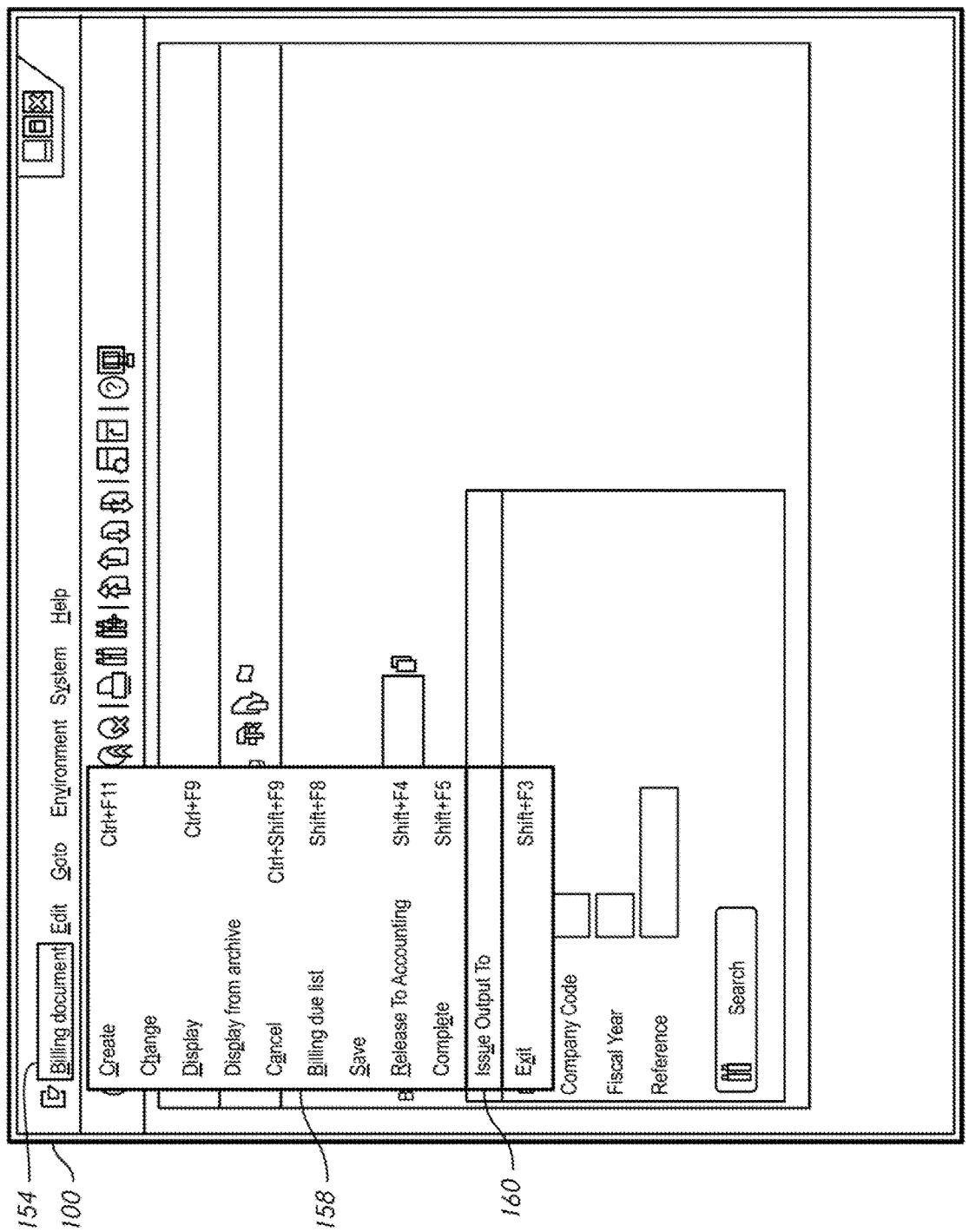
FIG. 10 is a screen shot illustrating one preferred embodiment of the present inventive system, Improved Standard Billing.
Figure 11:
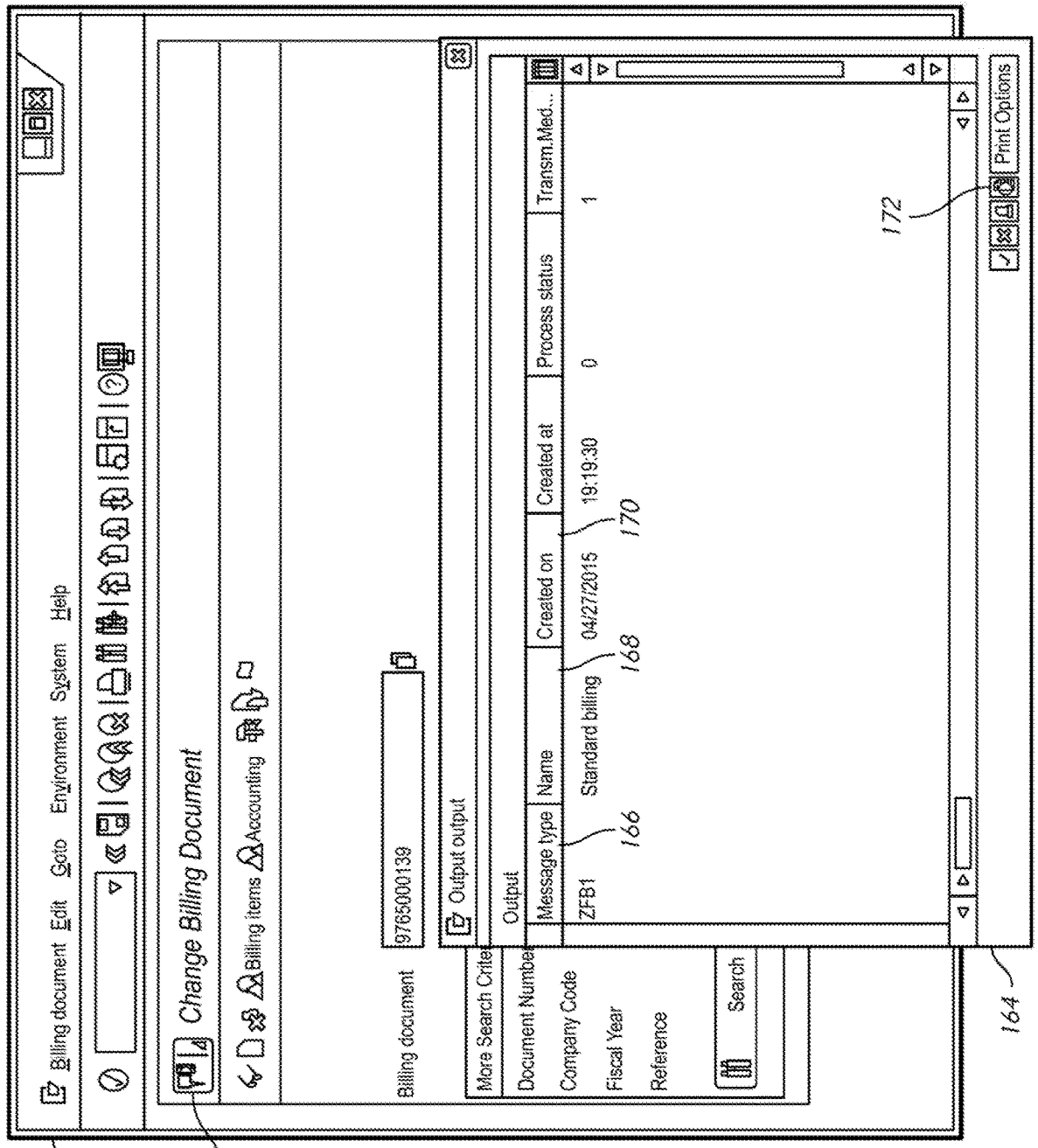
FIG. 11 a screen shot illustrating one preferred embodiment of the present inventive system, Improved Standard Billing.

Next, the User will click on the format selected and a new screen shot will appear as shown in FIG. 10 for Improved Standard Billing System 100, showing the Billing Document button 154, a Drop down menu 158 and the Menu item "Issue Output to" 160, and after that Menu 160 has been selected by the user and clicked on, a screen shot will appear as shown in FIG. 11.

FIG. 11 shows Improved Standard Billing System 100 with the Change Billing Document Header 162, a pop out box for Output 164 containing the following Menu items: Message Type 166, Name of Bill Format 168, Creation Date of Bill 170 and the Print Preview Icon 172.

FIG. 12 shows Improved Client Budget System 200 screen shot showing header 202 for "Client Quote by Level" and Client ID 204, Matter ID 206, Partner ID 208, Billable Currency (in USD) 210, Category 212 of Quote, Total Billable Hours 214, Minimum Rate 216, Maximum Rate 218, Average Rate 220, Select Rate 222, Total Fees 224 and Estimated Cost 226. This appears to be a screen shot for a Banded Rate where numerous Partners with higher billing rates will work together with lower billing rate Junior Partners and Associates, but the client has only agreed to pay for one rate which is somewhere in between the highest paid Partner and the lowest paid Associate.

FIG. 13 show Client ID 204, Matter ID 206, Partner ID 208, Billable Currency (in USD) 210, Category 212, Total Billable Hours 214, Minimum Rate 216, Maximum Rate 218, Average Rate 220, Select Rate 222, Total Fees 224 and Estimated Cost 226 as well as a header 228 for "Client Matter Quote by Level. It also shows Office 234, Practice 252 and Level 256. In this view of the present invention for Client Budgeting, also shown are Discount Fees 230 and Margin % 232. The Client Discount is linked to the Client Fee agreement and is used for calculating the Discounted Matter Price by the Phase Tasks. Users providing Quotes to Clients may key in the Matter Quote Estimated hours ("Efforts"), the number of estimated resources and the System, on its own, will pull in a Min. Rate, a Maximum Rate, an Average Rate and will allow the User to Key into the Selected Rate desired, Further, this will consider Discount % offered for that Client which may be attributable to Matter Fee. Original Fees and Discount Fees are also shown.

Estimated Cost may also be calculated by the improved System automatically base on Master data maintained that the Resource Level and it will contribute toward calculation of New Profit Margin %.

FIG. 14 shows Matter Quote Summary by Phase header 205, as well as Client ID 204, Matter ID 206, Partner ID 208, Billable Currency (in USD) 210, Phase or Task 233, Total Hours 236, Hours % 238, Total Fees 240, Fees % 242 and Average Billing Rate 244. A Matter Quote, once saved at the Matter Level will be pushed to the Summary Level on its own and can be pulling onto different Matter Summary Reports by Phas, Office, Level and partner.

FIG. 15 shows Matter Quote Summary by Office header 248, as well as Client ID 204, Matter ID 206, Partner ID 208, Billable Currency (in USD) 210, Office 234, Total Hours 236, Hours 238, Total Fees 240, Fees 242, the Averate Billing Rate 244 and tab Matter Summary by office tab 246.

FIG. 16 shows Matter Quote Summary by Practice Header 250 and as Client ID 204, Matter ID 206, Partner ID 208, Billable Currency (in USD) 210, Practice 252, Total Hours 236, Hours % 238, Total Fees 240 and Average Billing Rate 244.

FIG. 17 shows Matter Quote Summary by Level Header 254 including as Client ID 204, Matter ID 206, Partner ID 208, Billable Currency (in USD) 210, and Level 256, Total Hours 236, Hours % 238, Total Fees 240, Fees % 242 and Average Billing Rate 244. Show below is the Matter Summary tab 258. As another feature of the Present Invention, once Quote has been submitted into the System, it can be used as a template for setting up a new Real Matter and Budget.

Figure 18:
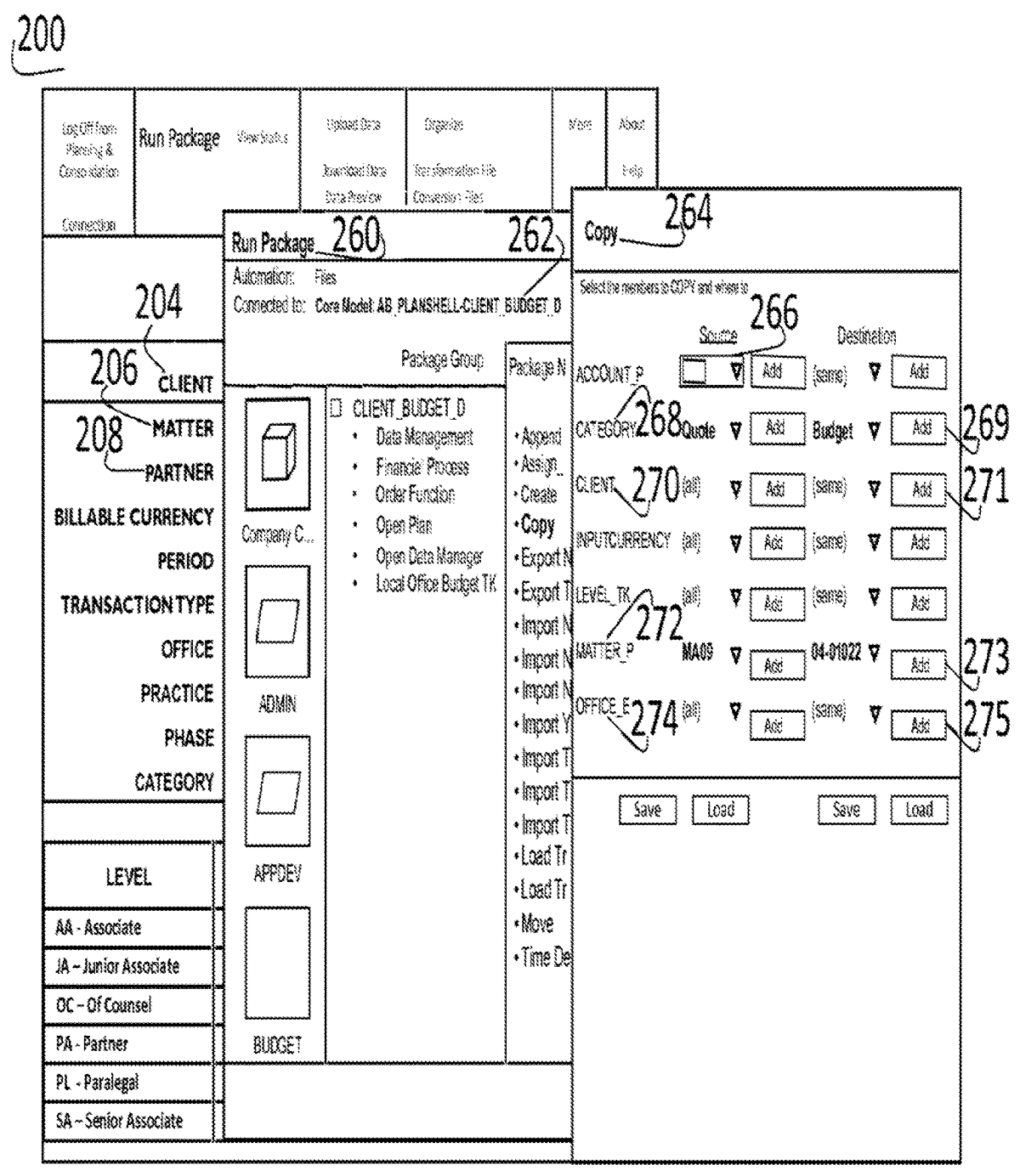

FIG. 18 shows how to pull up Actual Budget versus a Budge Variance by pulling up Variance Reports by Matter, Phase, or Level as follows. FIG. 18 shows Improved Client Budget System 200 having Client ID 204, Matter ID 206, Partner ID 208, a pop out box entitled "Run Package" 260 and an Identifier 262 for the Model Client Budget ID. Then a second pop out box entitled "Copy" 264 allows the user to select from the following Category 268, Client 270, Matter 272, and Office 274 in order to dictate a new Budget 269, or the same or different client 271, the same or different Matter 273 and the same or different Office 275.

Finally, FIG. 19 shows the present Inventive System, Improved Billing System 200 having a Report with a header "Actual vs. Budget Variance by Level 280. Also shown are Client ID 282, Matter ID 284, Partner 286 and a Report by Phase/Task 290, the breakouts by Level 292, Total Hours 294, Budget 296, Variance 298, Total Fees 300, Budget 302 and the Variance 304.

Although in the foregoing detailed description the present invention has been described by reference to various specific embodiments, it is to be understood that modifications and alterations in the structure and arrangement of those embodiments other than those specifically set forth herein may be achieved by those skilled in the art and that such modifications and alterations are to be considered as within the overall scope of this invention.

What is claimed is:

1. A computer system configured to process budget information, the computer system comprising:
    an application server comprising a processing device and a non-transitory storage medium for storing instructions that when executed by the processing device cause the processing device to perform the following:
    receive, from at least one client user device, an unapproved budget proposal corresponding to at least one transaction performed for a client;
    send, to at least one management user device, the unapproved budget proposal corresponding to the at least one transaction performed for the client;
    receive, from the at least one management user device, approval of the budget proposal based at least in part on management authorization to provide an approved budget;
    send an approval communication corresponding the approved budget to the at least one client user device;
    create budget data according to the approved budget;
    accept data entries from one or more timekeeper which relate to the at least one transaction performed for the client;
    create a work in progress report based on the data entries;
    calculate expenses corresponding to the at least one transaction performed for the client based on the work in progress report;
    flag the budget data when the expenses corresponding to the at least one transaction performed for the client reach a predefined percentage of the approved budget;
    upon triggering the flag that the expenses corresponding to the at least one transaction performed for the client have exceeded the predefined percentage of the approved budget, automatically generate a communication to each of the at least one client user device and the at least one management user device that the predefined percentage of the approved budget has been exceeded;
    create a draft bill for the client based on the work in progress report;
    upon approval of the draft bill, create a final bill for the client based on the draft bill;
    enable direct editing of the work in progress report, the draft bill, or the final bill by one or more person;
    cause the direct edits made to any of the work in progress report, the draft bill, or the final bill to be reflected in the data entries, such that the edits are also reflected in future work in progress reports, draft bills and final bills which are created from the data entries; and
    generate a first user interface enabling selection of a final invoice number and displaying the final bill with at least an item column, a description column, a billed quantity column and a net value column; and
    generate a second user interface upon selection of the final invoice number and further selection to change a header on the first user interface, the second user interface including an output panel configured to generate a popout box with a list of a plurality of different output types for the final bill which are selectable by a user.

2. The computer system of claim 1, wherein the storage medium further comprises instructions that, when executed by the processing device, cause the processing device to perform at least one of:
    when expenses corresponding to the at least one transaction performed for the client exceed the predefined percentage of the approved budget:
    write off excess budget data, provide courtesy credit, or create a new budget for client approval.

3. The computer system of claim 1, wherein the storage medium further comprises instructions that, when executed by the processing device, cause the processing device to:
    enable a user to add or delete columns of information in an on screen format of the draft bill such that the added or deleted columns are reflected in the final bill displayed by the user interface.

4. The computer system of claim 1, wherein the storage medium further comprises instructions that, when executed by the processing device, cause the processing device to:
generate an additional popout box for a selected output type of the plurality of different output types, the popout box including at least a name, creation date and print preview icon.

5. The computer system of claim 1, wherein
the plurality of different output types each correspond to a different template for the final bill.

6. The computer system of claim 1, wherein the storage medium further comprises instructions that, when executed by the processing device, cause the processing device to:
generate the popout box with the list of the plurality of different output types for the final bill based on selection of an output field icon within the output panel.

7. The computer system of claim 1, wherein
the popout box with the list of the plurality of different output types includes at least a standard billing option and an alternative option.

8. The computer system of claim 1, wherein the storage medium further comprises instructions that, when executed by the processing device, cause the processing device to:
update the output panel to include a selected output type of the plurality of different output types upon selection by a user.

9. In an application server, a method for processing budget information, the method comprising:
receiving, by the application server from at least one client user device, an unapproved budget proposal corresponding to at least one transaction performed for a client;
sending, by the application server to at least one management user device, the unapproved budget proposal corresponding to the at least one transaction performed for the client;
receiving, by the application server from the at least one management user device, approval of the budget proposal based at least in part on management authorization to provide an approved budget;
sending, by the application server, an approval communication corresponding the approved budget to the at least one client user device;
creating, by the application server, budget data according to the approved budget;
accepting, by the application server, data entries from one or more timekeeper which relate to the at least one transaction performed for the client;
creating, by the application server, a work in progress report based on the data entries;
calculating, by the application server, expenses corresponding to the at least one transaction performed for the client based on the work in progress report;
flagging, by the application server, the budget data when the expenses corresponding to the at least one transaction performed for the client reach a predefined percentage of the approved budget;
upon triggering the flag that the expenses corresponding to the at least one transaction performed for the client have exceeded the predefined percentage of the approved budget, automatically generating a communication to each of the at least one client user device and the at least one management user device that the predefined percentage of the approved budget has been exceeded;
creating, by the application server, a draft bill for the client based on the work in progress report;
upon approval of the draft bill, creating, by the application server, a final bill for the client based on the draft bill;
enabling, by the application server, direct editing of the work in progress report, the draft bill, or the final bill by one or more person;
causing, by the application server, the direct edits made to any of the work in progress report, the draft bill, or the final bill to be reflected in the data entries, such that the edits are also reflected in future work in progress reports, draft bills and final bills which are created from the data entries; and
generating a first user interface enabling selection of a final invoice number and displaying the final bill with at least an item column, a description column, a billed quantity column and a net value column; and
generating a second user interface upon selection of the final invoice number and further selection to change a header on the first user interface, the second user interface including an output panel configured to generate a popout box with a list of a plurality of different output types for the final bill which are selectable by a user.

10. The method of claim 9, further comprising:
when expenses corresponding to the at least one transaction performed for the client exceed the predefined percentage of the approved budget:
writing off excess budget data, providing courtesy credit, or creating a new budget for client approval.

11. The method of claim 9, further comprising:
enabling a user to add or delete columns of information in an on screen format of the draft bill such that the added or deleted columns are reflected in the final bill displayed by the user interface.

12. The method of claim 9, further comprising:
generating an additional popout box for a selected output type of the plurality of different output types, the popout box including at least a name, creation date and print preview icon.

13. The method of claim 9, wherein
the plurality of different output types each correspond to a different template for the final bill.

14. The method of claim 9, further comprising:
generating the popout box with the list of the plurality of different output types for the final bill based on selection of an output field icon within the output panel.

15. The method of claim 9, wherein
the popout box with the list of the plurality of different output types includes at least a standard billing option and an alternative option.

16. The method of claim 9, further comprising:
updating the output panel to include a selected output type of the plurality of different output types upon selection by a user.

* * * * *